(12) United States Patent
Ikeda

(10) Patent No.: US 7,667,757 B2
(45) Date of Patent: Feb. 23, 2010

(54) SOLID-STATE IMAGING DEVICE AND DRIVING METHOD FOR SOLID-STATE IMAGING DEVICE

(75) Inventor: Katsumi Ikeda, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 454 days.

(21) Appl. No.: 11/797,857

(22) Filed: May 8, 2007

(65) Prior Publication Data
US 2007/0285518 A1      Dec. 13, 2007

(30) Foreign Application Priority Data
May 18, 2006   (JP)   ............................ P2006-139154

(51) Int. Cl.
*H04N 9/893*   (2006.01)
*H04N 5/225*   (2006.01)
*H04N 5/335*   (2006.01)

(52) U.S. Cl. .................... 348/316; 348/311; 348/312; 348/294; 348/298; 348/300

(58) Field of Classification Search ......... 348/294–312, 348/315–317, 319–323
See application file for complete search history.

(56) References Cited

U.S. PATENT DOCUMENTS

| 6,337,713 | B1* | 1/2002 | Sato | 348/311 |
|---|---|---|---|---|
| 2002/0071046 | A1* | 6/2002 | Harada | 348/316 |
| 2003/0025820 | A1* | 2/2003 | Miyahara | 348/323 |
| 2004/0080647 | A1* | 4/2004 | Inui et al. | 348/304 |
| 2005/0111061 | A1* | 5/2005 | Kobayashi | 358/513 |
| 2007/0206238 | A1* | 9/2007 | Kawai | 358/482 |

FOREIGN PATENT DOCUMENTS

| JP | 2004159033 A | * | 6/2004 |
|---|---|---|---|
| JP | 2004-364235 A | | 12/2004 |
| JP | 2005-151079 A | | 6/2005 |

* cited by examiner

*Primary Examiner*—Nhan T Tran
*Assistant Examiner*—Dwight Alex C Tejano
(74) *Attorney, Agent, or Firm*—Birch, Stewart, Kolasch & Birch, LLP

(57) ABSTRACT

A solid-state imaging device includes a photoelectric conversion unit 110, an analog shift register, and signal output units 131 and 132. The analog shift register is divided into a first transfer section 121 and a second transfer section 122 with a substantially central region of the analog shift register being set as a boundary. A common transfer section 123 is provided in the boundary between the first transfer section and the second transfer section. The common transfer section 123 selects, as a transfer path of signal charges transferred from the photoelectric conversion unit 110, either a first path through the first transfer section 121 or a second path through the second transfer section 122.

6 Claims, 22 Drawing Sheets

SOLID-STATE IMAGING DEVICE AND DRIVING METHOD FOR SOLID-STATE IMAGING DEVICE

BACKGROUND OF THE INVENTION

1. Technical Field

The invention relates to a solid-state imaging device including a photoelectric conversion section in which a plurality of photoelectric conversion elements for detecting pixels forming an image are arranged in a one-dimensional or two-dimensional manner, and a driving method for the solid-state imaging device.

2. Description of the Related Art

A solid-state imaging device having a plurality of photoelectric conversion elements arranged in a two-dimensional manner is basically configured as shown in FIG. 17, for example. That is, the solid-state imaging device includes a silicon substrate 301, photodiodes (PD) 302 serving as photoelectric conversion elements, vertical charge transfer sections (VCCD) 303, charge read regions (TG) 304, a horizontal charge transfer section (HCCD) 305, and a signal output amplifier 306. In addition, each of the vertical charge transfer sections 303 and the horizontal charge transfer section 304 are shift registers that can transmit analog signals using CCDs (charge coupled devices).

The plurality of photodiodes 302 are arranged on a surface of the silicon substrate 301. For example, the photodiodes 302 are arranged at intersections of a square lattice. That is, the plurality of photodiodes 302 arranged in the two-dimensional manner form a two-dimensional photoelectric conversion section. In addition, an optical color filter that each allows only a corresponding color component, such as 'R', 'G', and 'B', to pass therethrough is disposed on a light receiving surface of each photodiode 302, so that each of the photodiode 302 detects the corresponding color component. Each of the photodiodes 302 performs photoelectric conversion and generates an electric signal corresponding to an amount of electric charges, which is determined according to the intensity of received light, the length of exposure time, or the like.

Each vertical charge transfer section 303 is provided for each column so as to be positioned adjacent to the photodiodes 302 in each column. Each of the vertical charge transfer sections 303 extends in the vertical direction, that is, in the longitudinal direction (direction indicated by arrow 'Y') in FIG. 17.

Electric charges generated by the photodiodes 302 are transferred to the vertical charge transfer sections 303 through the charge read regions 304, sequentially transferred through the vertical charge transfer sections 303 in the direction indicated by the arrow Y. After reaching the horizontal charge transfer section 305, the electric charges are sequentially transferred through the horizontal charge transfer section 305 in the direction indicated by arrow X, and then output from the signal output amplifier 306 as electric signals in pixel unit.

FIG. 18 is a view illustrating a cross-sectional structure near one photodiode 302. As shown in the drawing, the charge read region 304 is formed at the position adjacent to each photodiode 302 disposed on the silicon substrate 301, and the vertical charge transfer section 303 is formed at the position adjacent to the charge read region 304. The vertical charge transfer section 303 is formed with a transfer channel 311 and an electrode 312. By applying a predetermined voltage (read pulse) to the electrode 312, an electric potential is applied to the charge read region 304, and thus a charge signal generated by the photodiode 302 can be transferred (read out) to the transfer channel 311. Since a plurality of independent electrodes including the electrode 312 are arranged on the transfer channel 311 along the direction indicated by arrow Y, the charge signal in the transfer channels 311 can be transmitted in the arrow Y direction by applying a voltage to the electrodes.

In recent years, it is demanded to photograph a high-resolution image. Accordingly, in order to respond to such demands, it is necessary to increase the number of photoelectric conversion elements provided in a photoelectric conversion section of a solid-state imaging device. However, in the vertical charge transfer section 303 or horizontal charge transfer section 305 described above, signal charges generated in photoelectric conversion elements are sequentially transferred in pixel unit in synchronization with a predetermined transfer pulse. Accordingly, if the number of photoelectric conversion elements increases, time taken until signal charges of all pixels are completely transferred becomes long. As a result, time required for imaging also becomes long.

For this reason, it has been tried to divide a photoelectric conversion section of a solid-state imaging device into a plurality of regions and to transfer signal charges independently for every divided region in the relate art. For example, in a technique disclosed in JP 2004-364235 A, a plurality of horizontal transfer sections corresponding to the above-mentioned horizontal charge transfer section 305 are provided in accordance with area division of a photoelectric conversion section.

For example, in a solid-state imaging device shown in FIG. 19, it is assumed that a photoelectric conversion section 300 is divided into two parts and that two horizontal charge transfer sections 305(1) and 305(2) are provided. In this case, since signal charges of the divided regions can be transferred simultaneously (in parallel) using the two horizontal charge transfer sections 305(1) and 305(2), the pixel number of signal charges that each horizontal charge transfer section is to transfer becomes half of the total number. Accordingly, signal charges may be completely transferred within half of normally required time.

However, since the signal output amplifier 306 from which electric signals are output in the pixel unit is provided at the downstream end of the horizontal charge transfer section 305 as described above, it is necessary to prepare a plurality of signal output amplifiers 306 as well as the horizontal charge transfer sections 305 as shown in FIG. 19, in order to simultaneously transfer the signal charges of a plurality of regions.

However, it is difficult to form a plurality of signal output amplifier 306(1) and 306(2) whose electrical characteristics are equivalent to each other, on one semiconductor substrate. Therefore, in the solid-state imaging device having the configuration shown in FIG. 19, a difference in characteristics of the signal output amplifiers 306(1) and 306(2) causes a conversion gain difference, a linearity difference, and an offset (black level) difference, appearing in a photographed image. That is, in the case of creating a one-frame image by mixing a signal of each pixel output from the signal output amplifier 306(1) and a signal of each pixel output from the signal output amplifier 306(2), a brightness difference, coloring, or black floating at the time of darkness may occur in the resultant image. Particularly at a boundary position in a middle portion of the image frame, unnecessary line-shaped noises are generated, which significantly deteriorates the quality of an image.

The deterioration of the image quality described above may be suppressed, for example, by performing correction processing for multiplying either the signal of each pixel output from the signal output amplifier 306(1) or the signal of each pixel output from the signal output amplifier 306(2) by a preset constant. However, in the case of performing such correction using a constant, it is not possible to meet the change of an imaging environment.

For example, even if characteristics are accurately corrected immediately after switching on an imaging apparatus, ambient temperature changes, or a solid-state imaging device or other electronic devices positioned around the solid-state imaging device generate heat due to continuous imaging. As a result, temperatures of the signal output amplifiers 306(1) and 306(2) of the solid-state imaging device change. Then, since electrical characteristics of the signal output amplifiers 306(1) and 306(2) change differently, an error occurs in a result of the correction processing. As a result, it is not possible to avoid that the image quality deteriorates with time.

Therefore, JP 2004-364235 A proposes a configuration in which common reference charges generated by a special injection charge generating unit are injected into the two horizontal charge transfer sections and variation of characteristics is corrected using the reference charges.

Further, JP 2005-151079 A (corresponding to US 2005/0111061 A) proposes a technique for using an amount of light incident from an actual photographic subject as a signal for correction and for making an amount of light incident on a plurality of divided regions equal by using a blurring member, such as a frosted glass, when detecting the amount of incident light.

However, in the technique disclosed in JP 2004-364235 A, the reference charges additionally generated as well as signal charges of a photographed image should be injected into the respective horizontal charge transfer sections. Accordingly, since the number of components included in a solid-state imaging device increases, a structure thereof becomes complicated. In addition, since the same reference charges are not always injected into the plurality of horizontal charge transfer sections, exact correction may not be performed.

In addition, in the technique disclosed in JP 2005-151079 A (corresponding to US 2005/0111061 A), although correction is performed using the amount of light that is actually incident from a photographic substrate, the amount of light input to the plurality of horizontal charge transfer sections as a signal for correction does not correspond to an amount of original light from the same photographic subject. Accordingly, the correction cannot be performed precisely.

SUMMARY OF THE INVENTION

The invention to provides a solid-state imaging device that can read out signal charges at high speed by dividing a photoelectric conversion section into a plurality of regions and that can prevent quality deterioration of an image obtained by mixing signals generated by the plurality of divided regions without making the configuration complicated and a method of driving the solid-state imaging device.

(1) According to an aspect of the invention, a solid-state imaging device includes a photoelectric conversion section, an analog shift register and a signal output unit. The photoelectric conversion section includes a plurality of photoelectric conversion elements that are arranged along at least one axis direction on a predetermined semiconductor substrate. The analog shift register receives signal charges generated by the photoelectric conversion elements of the photoelectric conversion section and transfers the received signal charges in a predetermined direction. The signal output unit is connected to a downstream end of the analog shift register. The analog shift register is divided into a first transfer section and a second transfer section with a substantially central region of the analog shift register being set as a boundary. A common transfer section is provided in the boundary between the first transfer section and the second transfer section. The common transfer section selects, as a transfer path of the signal charges transferred from the photoelectric conversion section, either a first path passing through the first transfer section or a second path passing through the second transfer section.

With the solid-state imaging device described above, the common transfer section can select a path, through which signal charges transferred from the photoelectric conversion section are transferred, from the first path and the second path. That is, the common transfer section can output the signal charges, which are transferred from the photoelectric conversion section, through the first path and a first signal output unit connected to a downstream end of the first path, and can also output the signal charges through the second path and a second signal output unit connected to a downstream end of the second path.

Accordingly, for example, by making a control such that imaging on the same photographic subject is continuously performed at least twice, signal charges generated by photoelectric conversion elements of the photoelectric conversion section in the first imaging are output from the common transfer section through the first path and the first signal output unit, and signal charges generated by the photoelectric conversion elements of the photoelectric conversion section in the second imaging are output from the common transfer section through the second path and the second signal output unit, common signal charges corresponding to an amount of light that the photoelectric conversion elements located at predetermined regions of the photoelectric conversion section receive from the common photographic subject can be output through both the first signal output unit and the second signal output unit. In addition, by performing signal correction so that a signal output from the first signal output unit and signal output from the second signal output unit have the same level, the difference in characteristics of the first signal output unit and second signal output unit can be accurately corrected. In addition, since it is possible to correct the signal charges using the light received from the photographic subject, the structure is not complicated. Moreover, in the same manner as described above, the invention may also be applied to a linear image sensor in which a plurality photoelectric conversion elements are arranged in the one-dimensional manner, without being limited to the above two-dimensional solid-state imaging device in which a plurality photoelectric conversion elements are arranged in the two-dimensional manner.

(2) In the solid-state imaging device of (1), each of the first transfer section, the second transfer section and the common transfer section of the analog shift register may include a charge transfer path and a charge transfer electrode section. The charge transfer path includes an impurity layer formed on the semiconductor substrate. The charge transfer electrode section is disposed at a position opposite to the charge transfer path. Each of the charge transfer electrode sections includes a plurality of electrode pairs disposed along the charge transfer path. Each of the plurality of electrode pairs includes a first electrode and a second electrode disposed at a position adjacent to the first electrode. At least one of the first electrode and the second electrode of the charge transfer electrode section of the common transfer section of the analog shift register is wired so as to be electrically independent from the first and second electrodes of the first transfer section and the first and second electrodes of the second transfer section.

This solid-state imaging device described is premised on that the analog shift register constitutes a CCD device. That is, by sequentially applying two-phase transfer pulses to a plurality of electrode pairs arranged along the predetermined axis direction, the signal charges can be transferred in the pixel unit through the charge transfer path opposite to the electrode pairs. In addition, in the first transfer section and the second transfer section, the first and second electrodes forming each of the electrode pairs may be wired to a common terminal and transfer pulses having the same phase can be applied to the first and second electrodes of each electrode pair.

On the other hand, in the common transfer section, at least one of the first and second electrodes is wired so as to be electrically independent from the first and second electrodes of the first and second transfer sections. Accordingly, transfer of signal charges in the common transfer section can be performed independently from the first transfer section and the second transfer section. That is, by controlling an application order of transfer pulses applied to the first electrodes or the second electrodes of the common transfer section, it is possible to change the transfer direction of the signal charges toward the first transfer section or the second transfer section in the charge transfer path of the common transfer section. Accordingly, the common transfer section can output the signal charges, which are transferred from the photoelectric conversion section, through the first path and the first signal output unit connected to the downstream end of the first path or can also output the signal charges through the second path and the second signal output unit connected to the downstream end of the second path.

(3) The solid-state imaging device of (2) may further include a driving circuit. The driving circuit is connected to the charge transfer electrode section. The driving circuit applies driving signals, which are independent from each other, to the first and second electrodes of the common transfer section of the analog shift register. The driving circuit applies at least two kinds of driving signals to the first and second electrodes of the common transfer section of the analog shift register.

With this solid-state imaging device, a plurality of driving signals (same as transfer pulses) output from the driving circuit are independently applied to the first and second electrodes of the common transfer section. Thus, in the common transfer section, it is possible to change an order in which the driving signals change between the first and second electrodes adjacent to each other. As a result, it becomes possible to change the transfer direction of the signal charges in the common transfer section.

(4) The solid-state imaging device of (1) may further include a plurality of vertical charge transfer sections and a horizontal charge transfer section. The plurality of vertical charge transfer sections transfer the signal charges generated by the photoelectric conversion elements of the photoelectric conversion section in a column direction. The horizontal charge transfer section receives the signal charges output to downstream ends of the plurality of vertical charge transfer sections and transfers the received signal charges in a row direction. The photoelectric conversion section forms a two-dimensional imaging section in which the plurality of photoelectric conversion elements are arranged in the row and column directions in a two-dimensional manner. The configuration of the analog shift register is applied to the horizontal charge transfer section.

This solid-state imaging device is premised on that the photoelectric conversion section is divided into a plurality of regions in the horizontal direction in the two-dimensional solid-state imaging device having a plurality of photoelectric conversion elements arranged in the two-dimensional manner. That is, signal charges generated by the plurality of photoelectric conversion elements are transferred in the vertical direction through the vertical charge transfer sections provided independently for every column and then transferred in the horizontal direction through the horizontal charge transfer section. In addition, the photoelectric conversion part is divided into a plurality of regions near a middle portion in the horizontal direction, and the first transfer section, the second transfer section, and the common transfer section are provided in the shift register of the horizontal charge transfer section. Therefore, time taken for horizontal transfer of signal charges in the horizontal charge transfer section can be shortened to about half of normally required time.

(5) The solid-state imaging device of (1) may further include a plurality of vertical charge transfer sections and a horizontal charge transfer section. The plurality of vertical charge transfer sections transfer the signal charges generated by the photoelectric conversion elements of the photoelectric conversion section in a column direction. The horizontal charge transfer section receives the signal charges output to downstream ends of the plurality of vertical charge transfer sections and transfers the received signal charges in a row direction. The photoelectric conversion section forms a two-dimensional imaging section in which the plurality of photoelectric conversion elements are arranged in the row and column directions in a two-dimensional manner. The configuration of the analog shift register is applied to each of the vertical charge transfer sections.

This solid-state imaging device is premised on that the photoelectric conversion section is divided into a plurality of regions in the vertical direction in the two-dimensional solid-state imaging device having a plurality of photoelectric conversion elements arranged in the two-dimensional manner. That is, the signal charges generated by the plurality of photoelectric conversion elements are transferred in the vertical direction through the vertical charge transfer sections provided independently for every column and then transferred in the horizontal direction through the horizontal charge transfer section. In addition, the photoelectric conversion part is divided into a plurality of regions near a middle portion in the vertical direction, and the first transfer section, the second transfer section, and the common transfer section are provided in a shift register of the vertical charge transfer section. Therefore, time taken for vertical transfer of the signal charges in the vertical charge transfer section can be shortened to about half of normally required time.

(6) According to another aspect of the invention, a driving method for the solid-state imaging device of any of (1) to (5), includes: transferring the signal charges generated by the photoelectric conversion section to the analog shift register; transferring the signal charges, which are received by the common transfer section of the analog shift register, on the analog shift register through one of the first and second paths; transferring the signal charges generated by the photoelectric conversion section to the analog shift register again; transferring the signal charges, which are received by the common transfer section of the analog shift register, on the analog shift register through the other of the first and second paths; and correcting an output signal based on a difference between a first signal and a second signal. The first signal is output based on the signal charges which are received by the common transfer section and which are transferred through the one of the first and second paths. The second signal is output by the signal charges which are received by the common transfer section and which are transferred through the other of the first and second paths.

With this driving method for the solid-state imaging device, the solid-state imaging device is driven according to the procedures of the invention. That is, a difference between a first signal transmitted and output using the first path and a second signal transmitted and output using the second path can be detected using common signal charges generated by the photoelectric conversion elements that detect light incident from the same photographic subject. As a result, it is possible to correct a difference in the characteristics of the first signal output unit connected to a downstream end of the first path and a second signal output unit connected to a downstream end of the second path.

According to the configurations, since the common transfer section of the analog shift register can select a path, through which signal charges transferred from the photoelectric conversion section are transferred, from the first path and the second path, the common signal charges that are generated by the same photoelectric conversion elements using light incident from the same photographic subject can be transferred from the common transfer section to each of the first signal output unit connected to the downstream end of the first path and the second signal output unit connected to the downstream end of the second path. As a result, the difference in the characteristics of the first and second signal output units can be accurately corrected. In addition, since it is possible to correct the signal charges using the light received from the photographic subject, it is possible to prevent the structure from becoming complicated.

DETAILED DESCRIPTION OF EMBODIMENTS
OF THE INVENTION

First Embodiment

Hereinafter, a solid-state imaging device and a method of driving a solid-state imaging device according to exemplary embodiments of the invention will be described in detail with reference to FIGS. 1 to 7.

Figure 1:
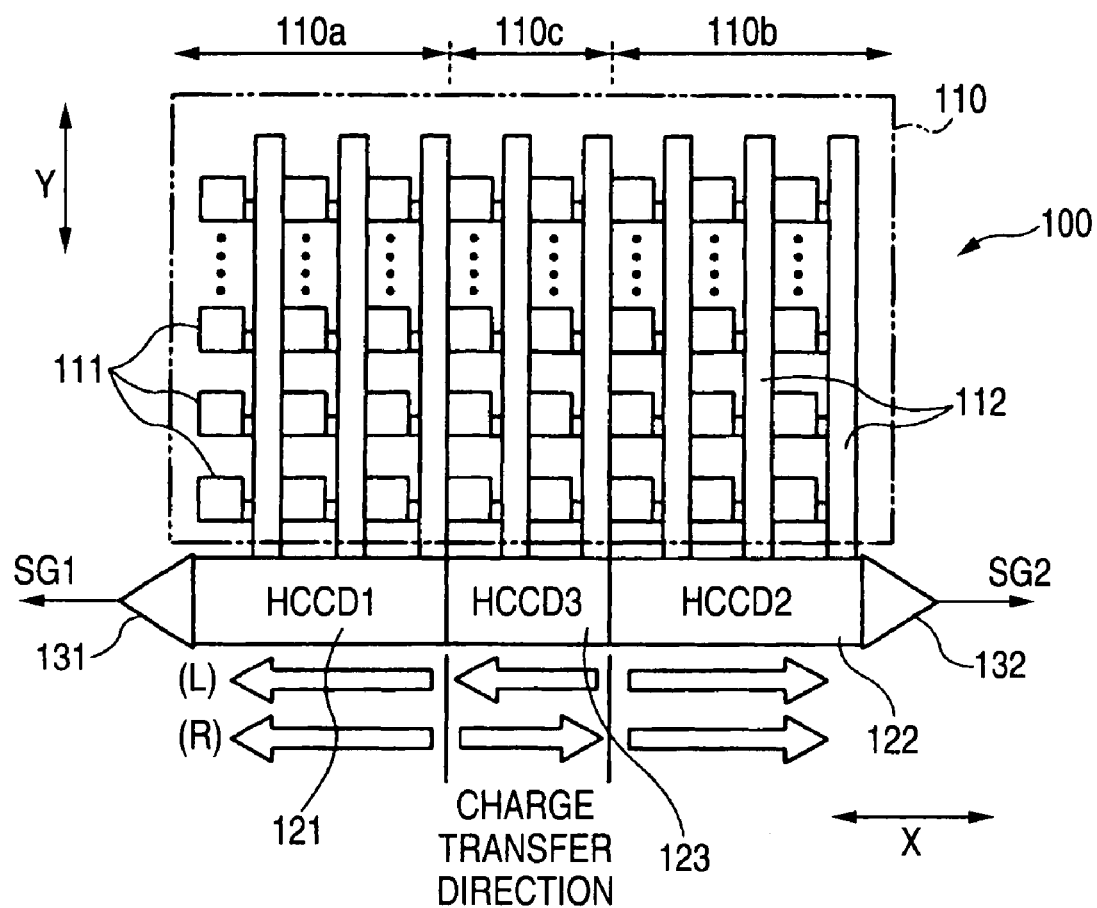
FIG. 1 is a planar block diagram illustrating main constituent components of a solid-state imaging device according to a first embodiment.

FIG. 1 is a planar block diagram illustrating main constituent components of a solid-state imaging device according to a first embodiment.

Figure 17:
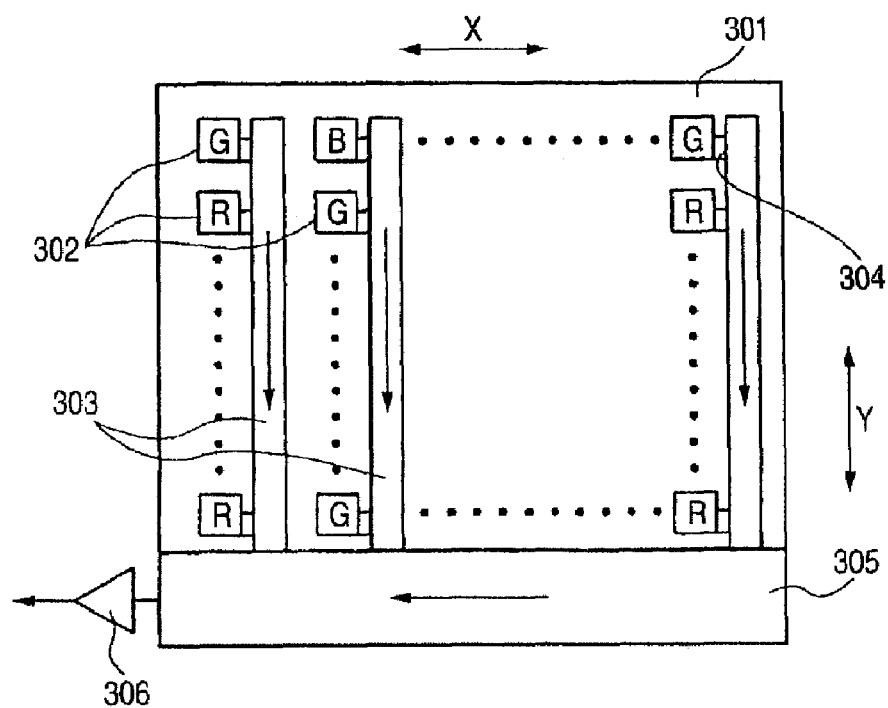
FIG. 17 is a block diagram illustrating the basic configuration of a general two-dimensional solid-state imaging device.
Figure 18:
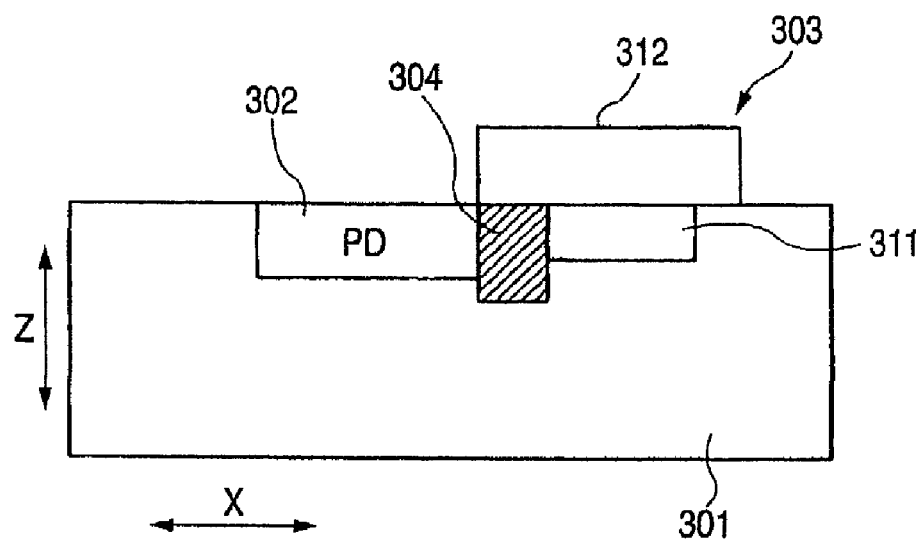
FIG. 18 is a longitudinal sectional view illustrating a cross-sectional structure of a part of the two-dimensional solid-state imaging device shown in FIG. 17.

In this embodiment, it is assumed that the invention is applied to a two-dimensional solid-state imaging device for use in a digital camera or the like. Since the basic configuration and operation of the solid-state imaging device are the same as those of the solid-state imaging device shown in FIGS. 17 and 18, those described above may be referred to appropriately.

In a solid-state imaging device 100 shown in FIG. 1, a photoelectric conversion section 110 includes a plurality of photodiodes 111 arranged in a row direction (direction indicated by arrow X; horizontal direction) and in a column direction (direction indicated by arrow Y; vertical direction) at predetermined intervals. In addition, vertical charge transfer sections (VCCD) 112 are provided in boundary portions between the columns of the photodiodes 111. Therefore, signal charges (which are determined in accordance with an amount of light received by the photodiodes 111) generated by the photodiodes 111 are transferred to the vertical charge transfer sections 112 existing at adjacent positions, sequentially transferred in pixel units through transfer channels, which are provided in the vertical charge transfer sections 112, in the arrow Y direction, and then transferred to horizontal charge transfer sections that are analog shift registers.

In this case, if the number of photodiodes 111 provided in the photoelectric conversion section 110 is large, time taken for transfer of signal charges in the vertical charge transfer sections 112 or time taken for transfer in the horizontal charge transfer section becomes long. Therefore, in the present embodiment, as shown in FIG. 1, the photoelectric conversion section 110 is divided into three regions 110a, 110b, and 110c in the horizontal direction, the horizontal charge transfer section is also divided into three parts to provide horizontal charge transfer sections (HCCD) 121, 122, and 123 that can be independently controlled.

Signal charges transferred through the vertical charge transfer sections 112 in columns belonging to the region 110a of the photoelectric conversion section 110 are input to the horizontal charge transfer section (HCCD1) 121. In addition, signal charges transferred through the vertical charge transfer sections 112 in columns belonging to the region 110b are input to the horizontal charge transfer section (HCCD2) 122. In addition, signal charges transferred through the vertical charge transfer sections 112 in columns belonging to the region 110c are input to the horizontal charge transfer section (HCCD3) 123.

Furthermore, the region 110c is located in the substantially central portion of the photoelectric conversion section 110, and the size of the region 110b is equal to that of the region 110a. Furthermore, since the region 110c is separated from the other regions in order to extract a common signal for correction, the region 110c may have a necessary minimum size or be smaller than the region 110a and the region 110b.

In the horizontal charge transfer section (HCCD1) 121, the direction of transfer of signal charges is always constant and the signal charges are transferred from right to left in FIG. 1. Also, in the horizontal charge transfer section (HCCD2) 122, the direction of transfer of signal charges is always constant and the signal charges are transferred from left to right in FIG. 1.

Accordingly, signal charges generated by the photodiodes 111 belonging to the region 110a reach the horizontal charge transfer section (HCCD1) 121 through the corresponding vertical charge transfer sections 112, sequentially transferred through a transfer channel within the horizontal charge transfer section (HCCD1) 121 from right to left in FIG. 1, and then output as an image signal SG1 from a signal output amplifier 131. In addition, signal charges generated by the photodiodes 111 belonging to the region 110b reach the horizontal charge transfer section (HCCD2) 122 through the corresponding vertical charge transfer sections 112, sequentially transferred through a transfer channel within the horizontal charge transfer section (HCCD2) 122 from left to right in FIG. 1, and then output as an image signal SG2 from a signal output amplifier 132.

On the other hand, in the horizontal charge transfer section (HCCD3) 123 located in the substantial center, it is possible to change the direction of transfer of signal charges by changing a transfer pulse applied thereto from the outside. That is, it may be possible to transfer the signal charges from right to left in FIG. 1 or to transfer the signal charges from left to right in FIG. 1.

That is, the solid-state imaging device 100 according to the present embodiment is configured so that the photoelectric conversion section 110 is divided into the HCCD1 serving as a first transfer section and the HCCD2 serving as a second transfer section with a substantially central region of the horizontal charge transfer section 110 serving as an analog shift register being used as a boundary therebetween, that the HCCD3 serving as a common transfer section is provided in the boundary between the HCCD1 and the HCCD2, and that the HCCD3 can select either a first path through the HCCD1 or a second path through the HCCD2, which are shown by (L) and (R) in FIG. 1, as a transfer path of signal charges transferred from the photoelectric conversion section.

Therefore, it is possible to make a control such that the signal charges generated by the photodiodes 111 belonging to the region 110c are transferred through a transfer channel within the horizontal charge transfer section (HCCD3) 123 from right to left in the drawing and are then output from the signal output amplifier 131 through the horizontal charge transfer section (HCCD 1) 121. Alternatively, it is possible to make a control such that the signal charges generated by the photodiodes 111 belonging to the region 110c are transferred through the transfer channel within the horizontal charge transfer section (HCCD3) 123 from left to right in the drawing and are then output from the signal output amplifier 132 through the horizontal charge transfer section (HCCD2) 122.

That is, the signal charges generated by the photodiodes 111 belonging to the region 110c can be output as common signals from both the signal output amplifier 131 and the signal output amplifier 132.

Supposing that characteristics of the signal output amplifier 131 are completely the same as characteristics of the signal output amplifier 132, components of the common signal included in the image signal SG1 output from the signal output amplifier 131 would be completely the same as those of the common signal included in image signal SG2 output from the signal output amplifier 132.

However, actually, the characteristics of the signal output amplifier 131 are different from those of the signal output amplifier 132. As a result, a conversion gain difference, a linearity difference, and an offset (black level) difference appear between the image signal SG1 and the image signal SG2. In other words, by correcting a signal such that there is no difference between the common signal components in the image signal SG1 and the common signal components in the image signal SG2, the difference in the characteristics of the signal output amplifier 131 and the characteristics of the signal output amplifier 132 can be precisely compensated.

Here, signal charges that are generated by the photodiodes 111 belonging to the region 110c in one imaging (exposure) are output as only one of the image signal SG1 and image signal SG2. Accordingly, in order to compare the common signal in the image signal SG1 with the common signal in the image signal SG2, it is necessary to perform imaging (exposure) at least twice and to change the direction of transfer of the signal charges in the horizontal charge transfer section (HCCD3) 123 whenever imaging. For example, in a still-image imaging mode, it is preferable to finish the above-mentioned compensation during displaying of a through image on a built-in monitor before imaging.

Figure 2:
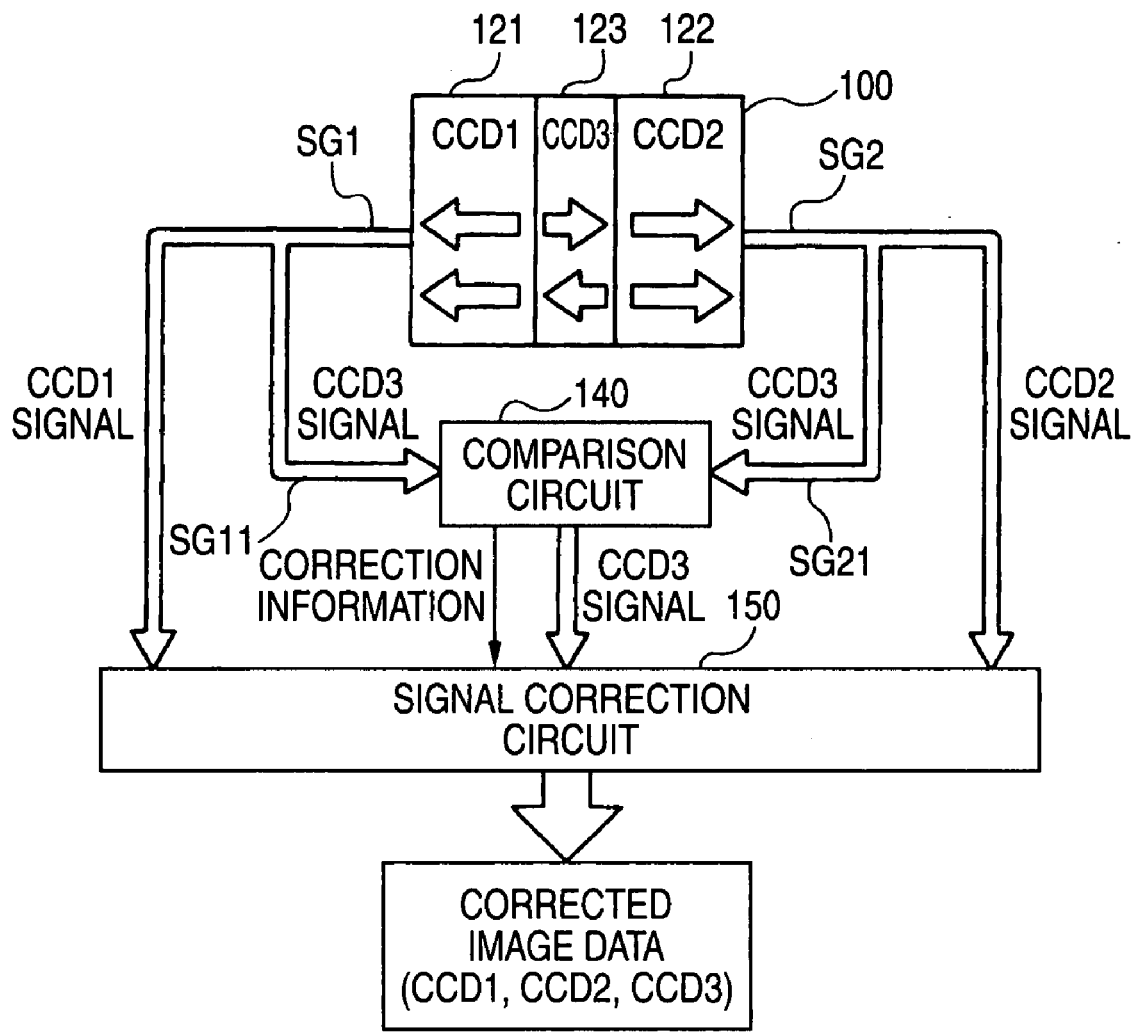
FIG. 2 is a block diagram illustrating an example of the configuration of the solid-state imaging device according to the first embodiment and a peripheral circuit for correcting image data obtained by imaging.

FIG. 2 is a block diagram illustrating an example of the configuration of the solid-state imaging device according to the first embodiment and a peripheral circuit for correcting image data obtained by imaging. That is, FIG. 2 illustrates the configuration of an electric circuit for correcting the image signals SG1 and SG2 obtained by imaging with the solid-state imaging device 100 shown in FIG. 1. As shown in FIG. 2, a comparison circuit 140 and a signal correction circuit 150 that are connected to output terminals of the solid-state imaging device 100 are provided.

Of the image signal SG1 output from the signal output amplifier 131 of the solid-state imaging device 100, only a component SG11 output from the horizontal charge transfer section (HCCD3) 123 is applied to an input terminal of the comparison circuit 140. Also, of the image signal SG2 output from the signal output amplifier 132 of the solid-state imaging device 100, only a component SG21 is output from the horizontal charge transfer section (HCCD3) 123 is applied to another input terminal of the comparison circuit 140.

Further, the comparison circuit 140 compares the signal component SG11 with the signal-component SG21 and then outputs correction information equivalent to the difference between the signal output amplifiers 131 and 132 in the characteristics, that is, the conversion gain difference, the linearity difference, and the offset (black level) difference.

The signal correction circuit 150 mixes the image signal SG1 and the image signal SG2 output from the solid-state imaging device 100 to generate a one-frame image, and performs processing for correcting the difference in the characteristics between the output amplifier 131 and the signal output amplifier 132 with respect to signals of pixels that constitute an image. For example, it is possible to obtain corrected image signals by applying parameters of the correction information, which is output from the comparison circuit 140, and image signal levels of the respective pixels to a conversion table prepared beforehand. A calculation expression for correction that is prepared beforehand may be used instead of the conversion table.

Moreover, in the case of actually performing correction, it is preferable to perform the signal processing such that one of the image signal SG1 and image signal SG2 is set as a reference and deviation of characteristics of the other image signal SG1 or SG2 with respect to the reference may be corrected.

Figure 3:
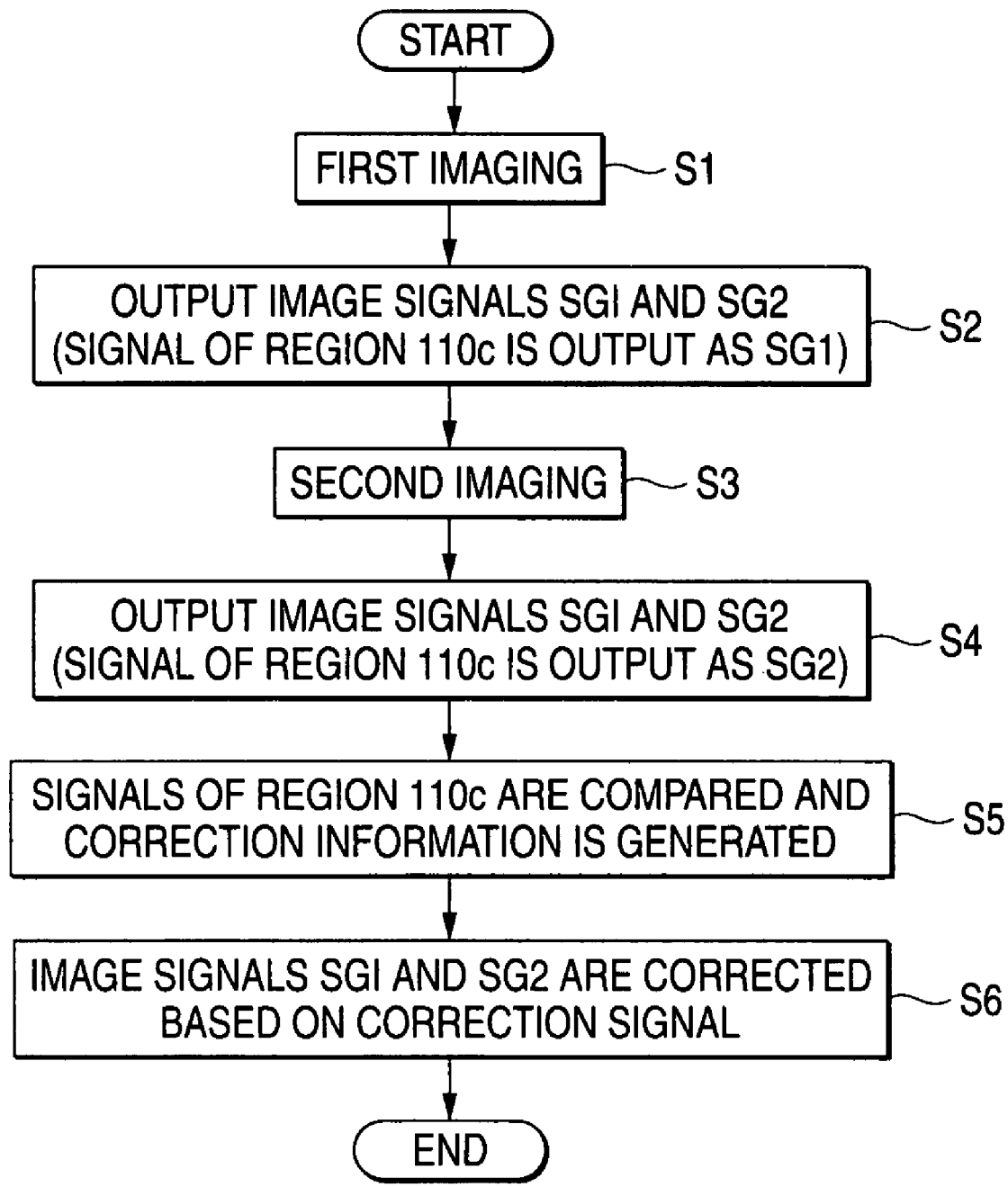
FIG. 3 is a flow chart illustrating procedures of correcting an image signal.

Procedures of the correction processing are shown in a flow chart of FIG. 3. The outline is as follows.

Step S1: A relationship between the solid-state imaging device 100 and a photograph subject is fixed, and first imaging is performed with the solid-state imaging device 100 over predetermined exposure time. That is, signal charges are generated by a photoelectric conversion section, and the generated signal charges are transferred to the horizontal charge transfer section (HCCD3) 123.

Step S2: A direction of transfer of the signal charges in the horizontal charge transfer section (HCCD3) 123 is set to the direction from right to left (or from left to right), and signal charges generated by the photodiodes 111 belonging to the region 110c are output as the image signal SG1 through the vertical charge transfer section 112, the horizontal charge transfer section (HCCD3) 123, the horizontal charge transfer section (HCCD1) 121, and the signal output amplifier 131.

Step S3: Second imaging is performed on the same photographic subject immediately after step S1 with the solid-state imaging device 100 over the same predetermined exposure time. As a result, signal charges are generated by the photoelectric conversion section, and the generated signal charges are transferred again to the horizontal charge transfer section (HCCD3) 123.

Step S4: A direction of transfer of the signal charges in the horizontal charge transfer section (HCCD3) 123 is set to the direction from left to right (or from right to left), and output signal charges generated by the photodiodes 111 belonging to the region 110c as the image signal SG2 through the vertical charge transfer section 112, the horizontal charge transfer section (HCCD3) 123, the horizontal charge transfer section (HCCD2) 122, and the signal output amplifier 132.

Step S5: Components of signal charges, which are transferred from the horizontal charge transfer section (HCCD3) 123, of the image signals SG1 output in step S2 are compared with components of signal charges, which are transferred from the horizontal charge transfer section (HCCD3) 123, of the image signal SG2 output in step S4 by means of the comparison circuit 140, and correction information equivalent to a difference therebetween is generated.

Step S6: The correction information acquired in step S5 is stored so as to be used as parameters for signal correction. That is, whenever performing the imaging, the signal correction circuit 150 corrects a signal of each pixel included in at least one of the image signal SG1 and image signal SG2 in accordance with the correction information.

Next, transfer of charges performed by the horizontal charge transfer section will be described in details.

Figure 4:
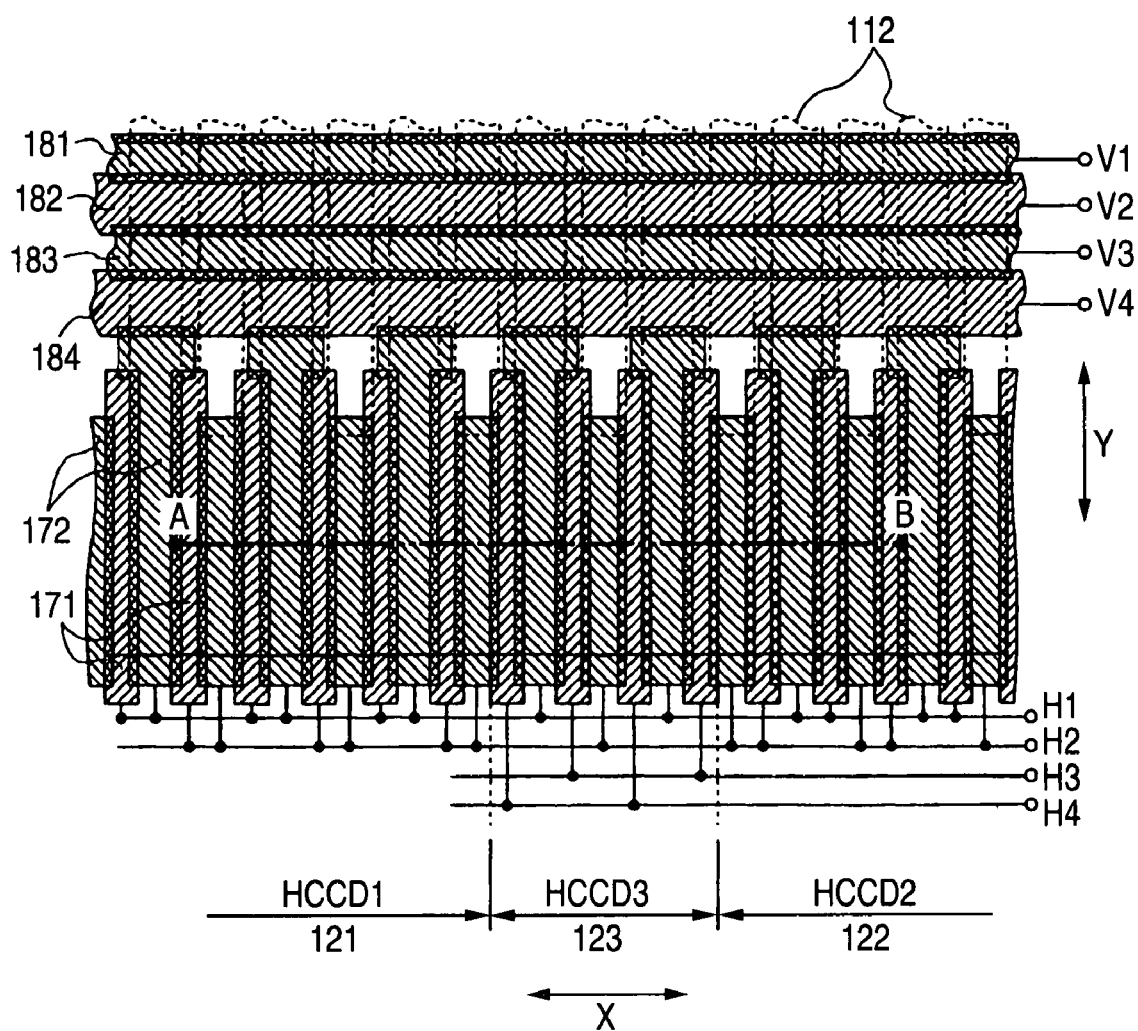
FIG. 4 is an enlarged plan view illustrating the detailed configuration of a part of the solid-state imaging device shown in FIG. 1.
Figure 5:
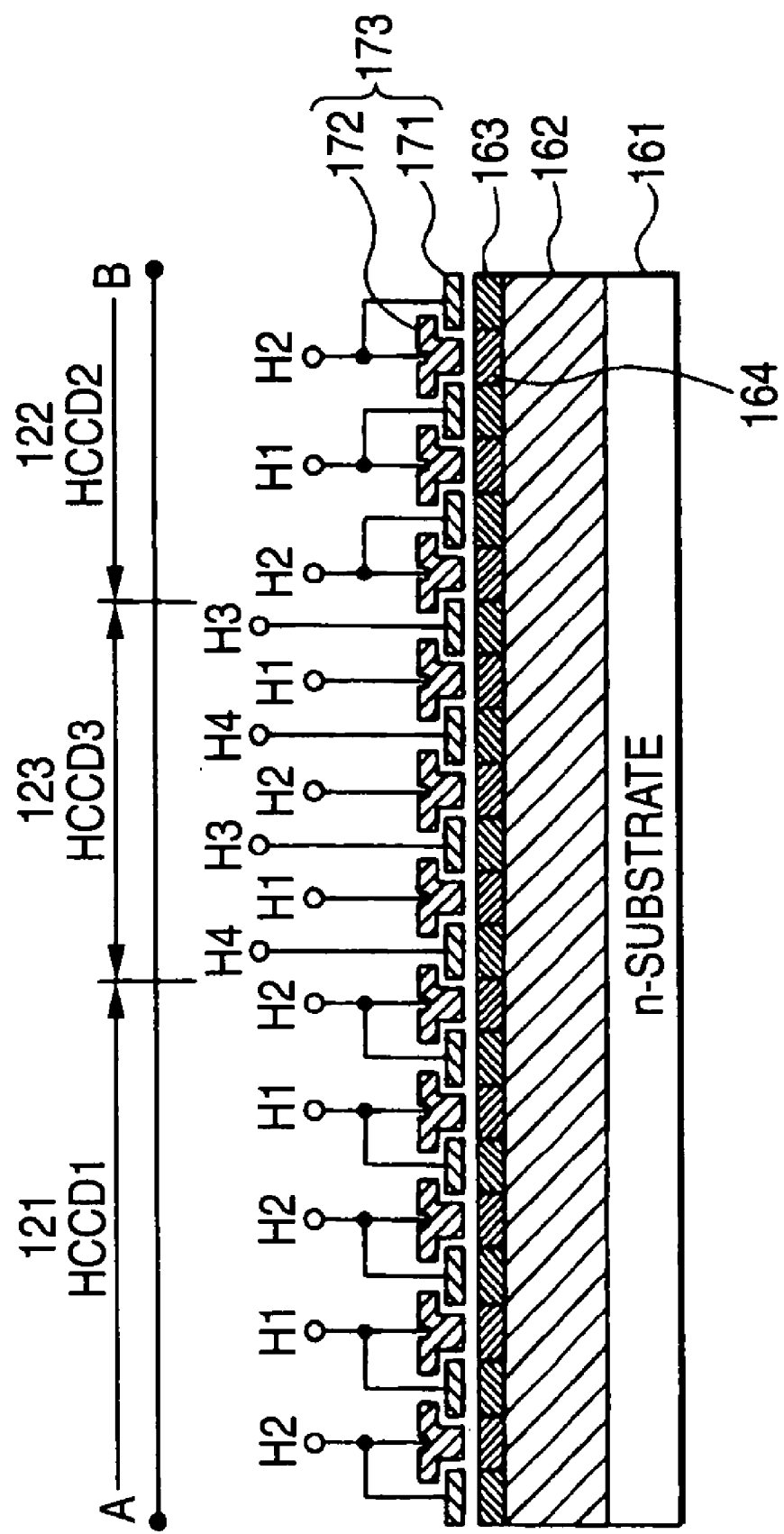
FIG. 5 is a longitudinal sectional view illustrating the section structure taken along the line A-B of FIG. 4.

FIG. 4 is an enlarged plan view illustrating the detailed configuration of a part of the solid-state imaging device shown in FIG. 1. Specifically, FIG. 4 illustrating the detailed configuration near the horizontal charge transfer section (HCCD3) 123. FIG. 5 is a longitudinal sectional view illustrating the section structure taken along the line A-B of FIG. 4.

As shown in FIG. 4, pulse signals for transfer control, that is, transfer pulses V1, V2, V3, and V4 of four phases are applied to the respective vertical charge transfer sections (VCCD) 112 through four electrodes 181 to 184. That is, each vertical charge transfer section (VCCD) 112 transfers signal charges in the vertical direction (direction indicated by arrow Y) by applying the predetermined transfer pulses V1, V2, V3, and V4 of four phases.

The signal charges, which have been transferred in the vertical direction by each vertical charge transfer section (VCCD) 112, are transferred into a channel of any one of the horizontal charge transfer sections 121 to 123 connected to the lowermost end of each vertical charge transfer section (VCCD) 112.

As shown in FIG. 5, in each of the horizontal charge transfer sections 121 to 123, a p-type impurity layer 162 is formed on an n-type semiconductor substrate 161 and impurity layers are formed on the p-type impurity layer 162. On a surface side of the substrate 161, two kinds of electrodes, that is, first electrodes 171 and second electrodes 172 are alternately disposed with predetermined gaps therebetween. The first electrode 171 and the second electrode 172 are electrically insulated from each other by a predetermined insulating layer. An n-type impurity layer 163 is formed below the first electrode 171, and an n$^-$-type impurity layer 164 is formed below the second electrode 172. The n$^-$-type impurity layer 164 is formed to be thinner than the n-type impurity layer 163. In addition, the first electrode 171 forms a 1-poly electrode, and the second electrode 172 forms a 2-poly electrode.

In the horizontal charge transfer section (HCCD1) 121 and the horizontal charge transfer section (HCCD2) 122, the first electrode 171 and the second electrode 172 disposed to be adjacent to be each other form each electrode pair 173. Here, in the horizontal charge transfer section (HCCD1) 121, the first electrode 171 and the second electrode 172 adjacent to a right side of the first electrode 171 form each electrode pair 173. In the horizontal charge transfer section (HCCD2) 122, the first electrode 171 and the second electrode 172 adjacent to a left side of the first electrode 171 form each electrode pair 173. That is, the horizontal charge transfer sections (HCCD1) 121 and (HCCD2) 122 are form in a mirror symmetry manner with respect to the horizontal charge transfer section (HCCD3) 123.

Further, in the horizontal charge transfer section (HCCD1) 121 and the horizontal charge transfer section (HCCD2) 122, the first electrode 171 and the second electrode 172 that form each electrode pair 173 are connected to each other through an external wiring line, such that the same signal is applied to the first electrode 171 and the second electrode 172. Furthermore, in the horizontal charge transfer section (HCCD1) 121 and the horizontal charge transfer section (HCCD2) 122, the plurality of electrode pairs 173 regularly arranged are alternately connected with common wiring lines, as shown in FIG. 4. Accordingly, two-phase transfer pulses H1 and H2 are alternately applied to each electrode pair 173.

On the other hand, in the horizontal charge transfer section (HCCD3) 123 located in the central portion, the first electrode 171 and the second electrode 172, which are adjacent to each other, are wired independently from each other as shown in FIG. 5. That is, four-phase transfer pulses H4, H1, H3, H2, H4, H1, and H3 are applied to the first electrodes 171 and the second electrodes 172 of the horizontal charge transfer section (HCCD3) 123 shown in FIG. 5, sequentially from the left end. Specifically, the two-phase transfer pulses H1 and H2 are alternately applied to the second electrodes 172 in the same manner as the other horizontal charge transfer sections (HCCD1 and HCCD2), and the transfer pulses H3 and H4 that are newly added are alternately applied to the first electrodes 171.

In each of the horizontal charge transfer sections 121 to 123, the signal charges transferred from the vertical charge transfer sections 112 are temporarily accumulated in channels formed below the first electrodes 171 and are then sequentially transferred in the horizontal direction according to transfer pulses applied to the first electrodes 171 and the second electrodes 172.

Figure 6:
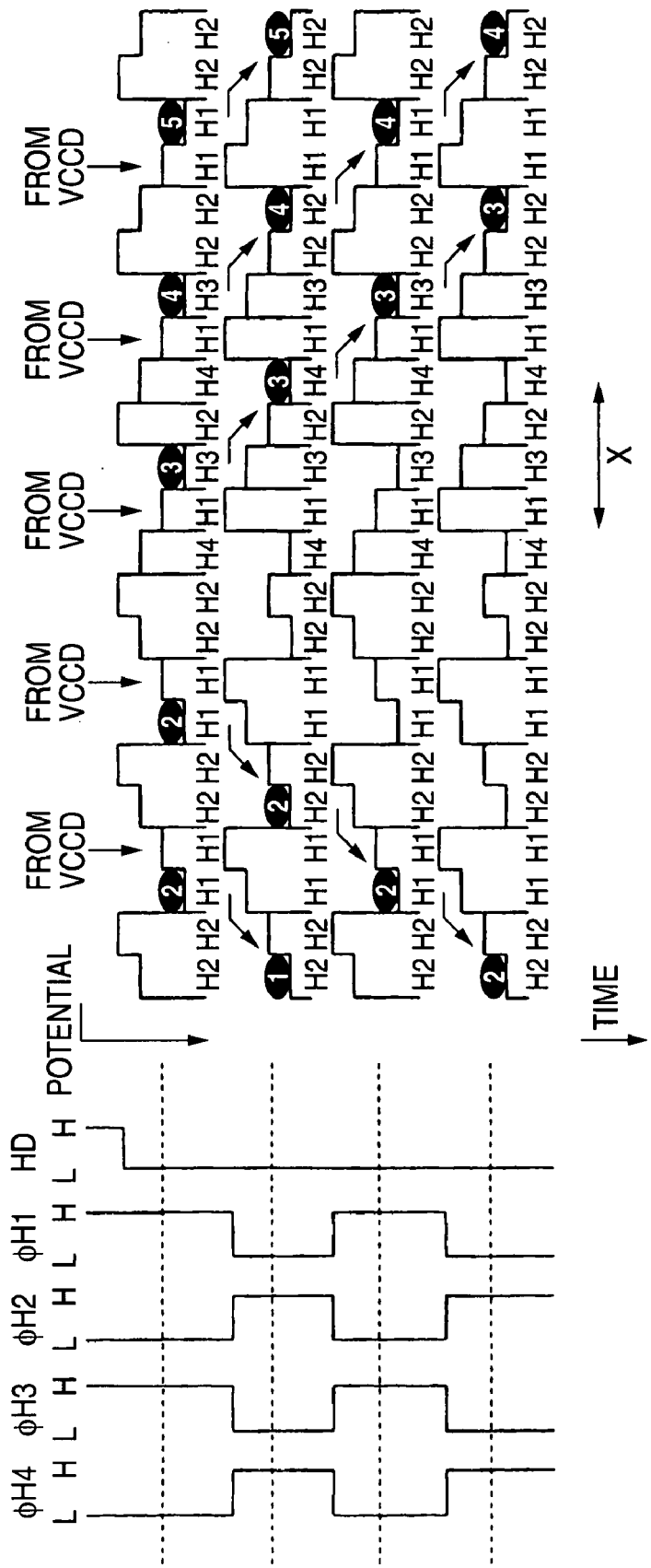
FIG. 6 is a timing chart illustrating an example of a horizontal transfer operation in the solid-state imaging device shown in FIG. 1.
Figure 7:
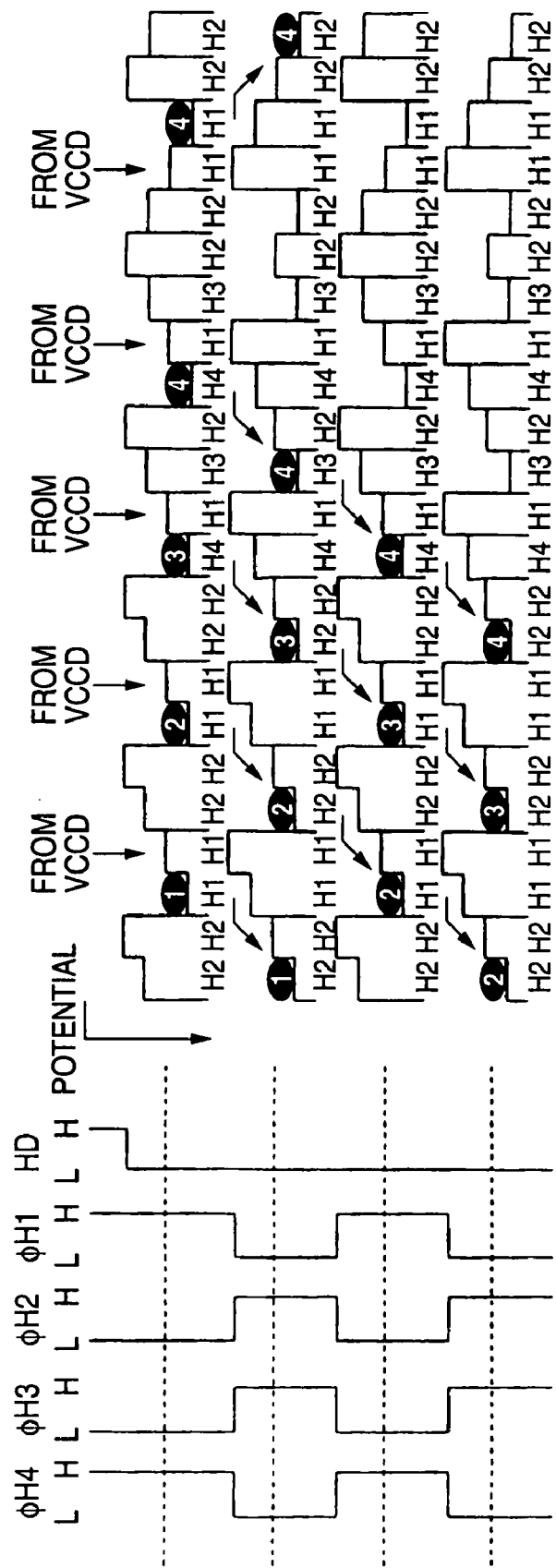
FIG. 7 is a timing chart illustrating an example of a horizontal transfer operation in the solid-state imaging device shown in FIG. 1.

Here, examples of a transfer operation of signal charges near the horizontal charge transfer section (HCCD3) 123, which is located in the central portion, are shown in FIGS. 6 and 7. FIG. 6 is a timing chart illustrating an example of a horizontal transfer operation in the solid-state imaging device shown in FIG. 1, and FIG. 7 is a timing chart illustrating an example of a horizontal transfer operation in the solid-state imaging device shown in FIG. 1. Also, change of electric potential distribution in the impurity layers disposed below the first electrode 171 and second electrode 172 is schematically shown on the right sides of FIGS. 6 and 7.

That is, as shown in FIG. 6, signal charges that the horizontal charge transfer section (HCCD3) 123 receives from each vertical charge transfer section (VCCD) 112 are transferred toward the HCCD2 side sequentially from left to right by applying signals, which have the same phases as those of the transfer pulses H1 and H2, as the transfer pulses H3 and H4. Moreover, as shown in FIG. 7, the signal charges that the horizontal charge transfer section (HCCD3) 123 receives from each vertical charge transfer section (VCCD) 112 are transferred toward the HDCCD1 side sequentially from right to left by applying signals, which have phases opposite to those of the transfer pulses H1 and H2, as the transfer pulses H3 and H4.

Therefore, in a circuit for generating the four-phase transfer pulses (H1, H2, H3, H4) in order to drive the solid-state imaging device 100 shown in FIG. 1, it is possible to change the direction of transfer of the signal charges in the horizontal charge transfer section (HCCD3) 123 by changing the phases of the transfer pulses H3 and H4 of the four-phase pulses to the same phases as the transfer pulses H1 and H2 or to phases opposite to those of the transfer pulses H1 and H2. As a result, the common signal charges generated by the region 110c of the photoelectric conversion section 110 can be output selectively to both the image signals SG1 and SG2.

Next, the first embodiment and a related-art example will be compared with each other in order to clarify a structural feature. In the related-art example shown in FIGS. 19 to 22, a two-dimensional solid-state imaging device in which a photoelectric conversion section is divided into two regions is illustrated.

Figure 19:
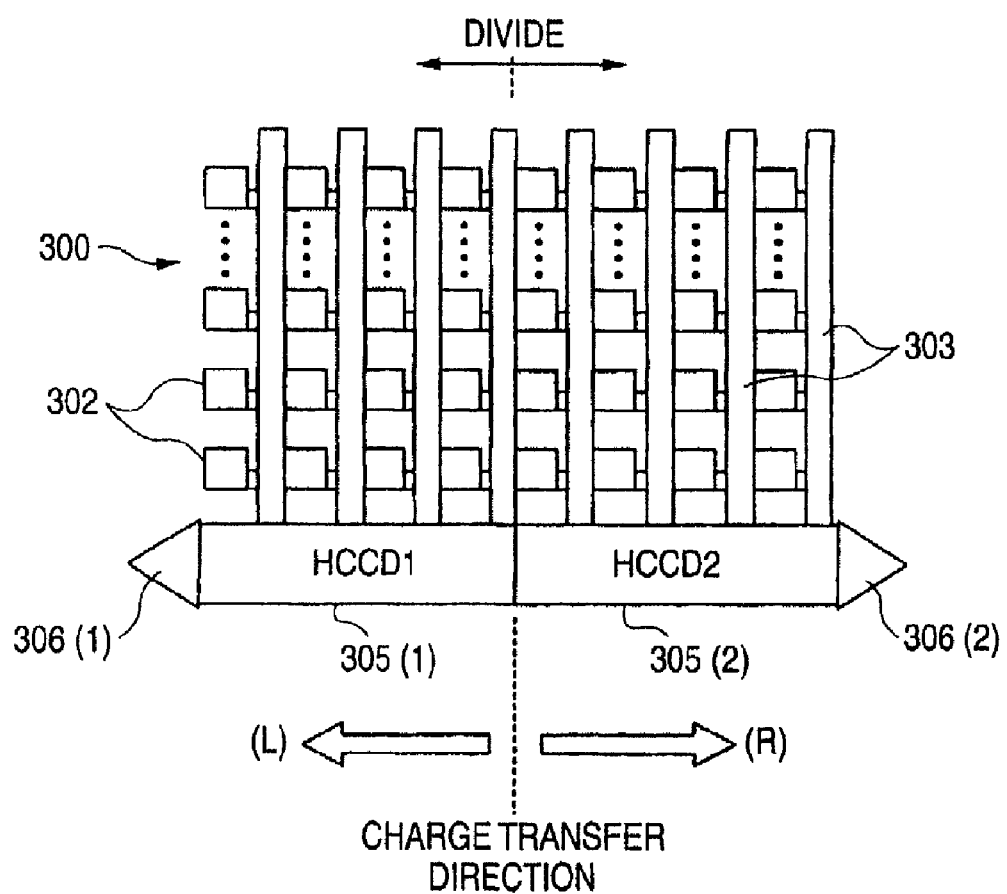
FIG. 19 is a block diagram illustrating main constituent components of a solid-state imaging device according to a related art, as viewed from the above.
Figure 20:
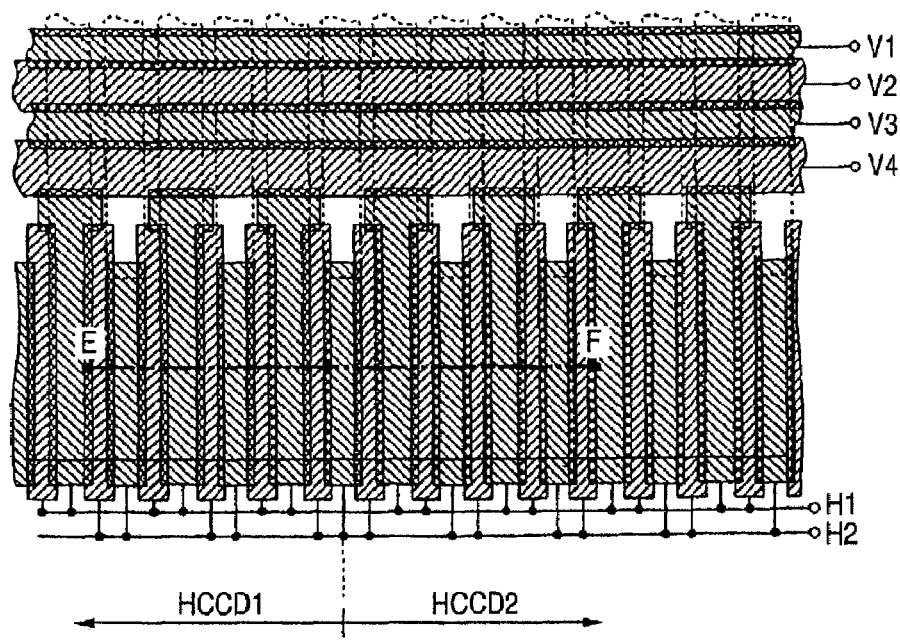
FIG. 20 is an enlarged plan view illustrating the detailed configuration of a part of the solid-state imaging device according to the related art shown in FIG. 19.
Figure 21:
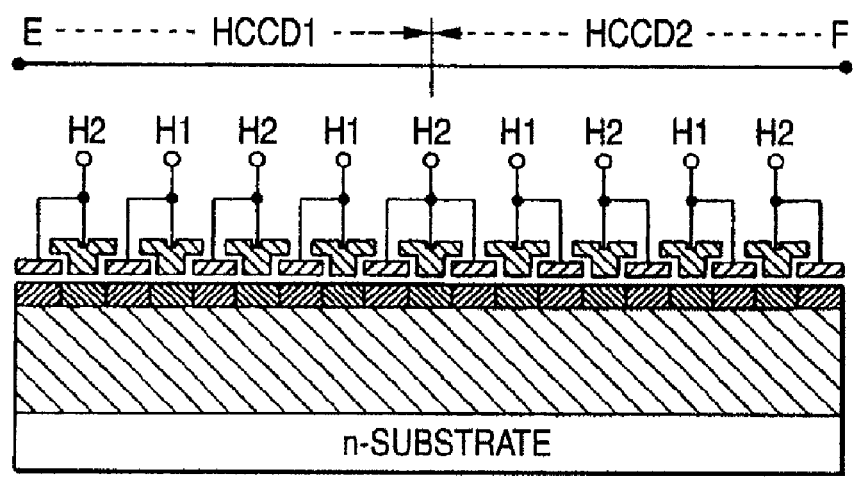
FIG. 21 is a longitudinal sectional view illustrating the section structure taken along the line E-F of FIG. 20
Figure 22:
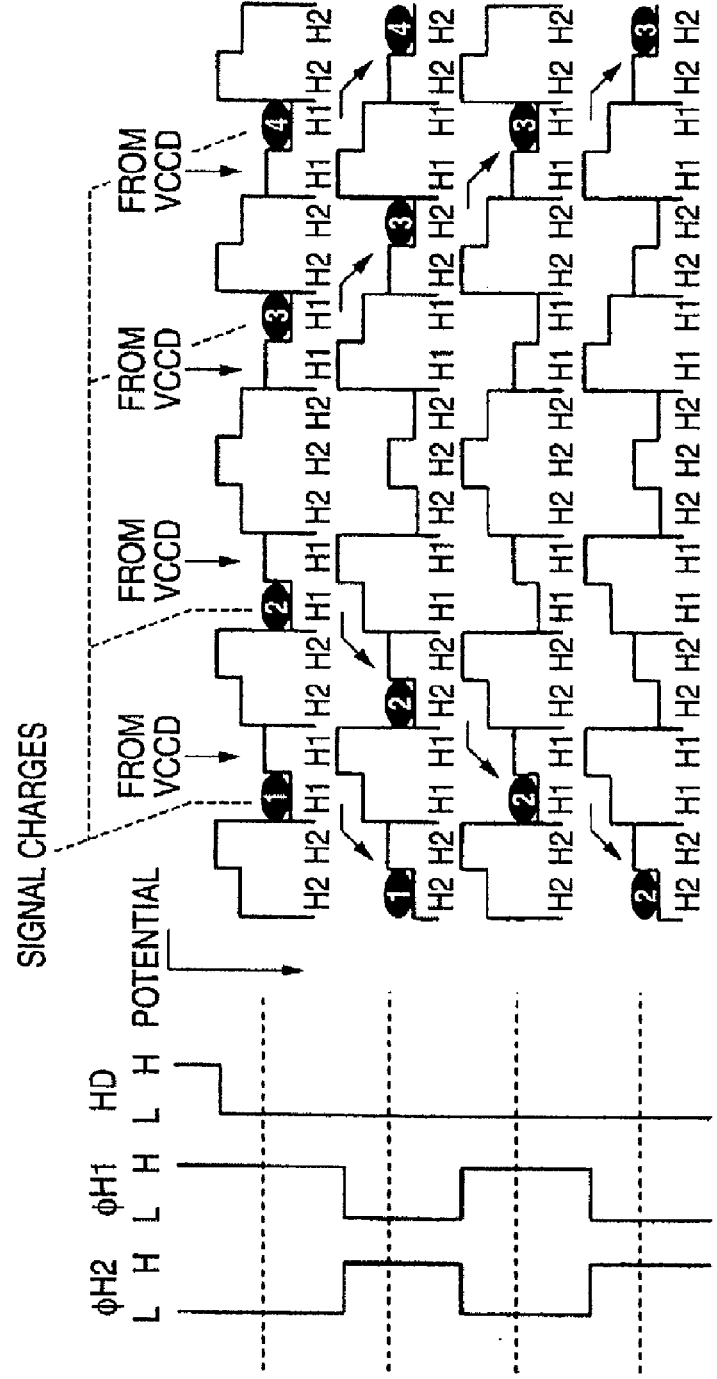
FIG. 22 is a timing chart illustrating an example of a horizontal transfer operation in the solid-state imaging device according to the related art shown in FIG. 19.

FIG. 19 is a block diagram illustrating main constituent components of a solid-state imaging device according to the related art as viewed from the above. FIG. 20 is an enlarged plan view illustrating the detailed configuration of a part of the solid-state imaging device according to the related art shown in FIG. 19. FIG. 21 is a longitudinal sectional view illustrating the section structure taken along the line E-F of FIG. 20. FIG. 22 is a timing chart illustrating an example of a horizontal transfer operation in the solid-state imaging device according to the related art shown in FIG. 19.

As shown in FIG. 19, in the related-art example, no horizontal charge transfer section (HCCD3) 123 that can switch the transfer direction and is shown in FIG. 1 is provided. Accordingly, in the related-art example, common signal charges cannot be output from the signal output amplifiers 306(1) and 306(2).

Also, in the related-art example, adjacent electrodes in each of the horizontal charge transfer sections (HCCD1 and HCCD2) are connected with each other even in a boundary therebetween as shown in FIG. 21, and the transfer is controlled with only the two-phase transfer pulses H1 and H2 as shown in FIG. 22. Accordingly, the transfer direction of the horizontal charge transfer section (HCCD1) is fixed in the direction from right to left, and the transfer direction of the horizontal charge transfer section (HCCD2) is fixed in the direction from left to right. Thus, it is not possible to apply common signal charges to the horizontal charge transfer sections (HCCD1 and HCCD2).

Second Embodiment

Hereinafter, a solid-state imaging device according to another embodiment of the invention will be described with reference to FIGS. 8 to 13.

Figure 8:
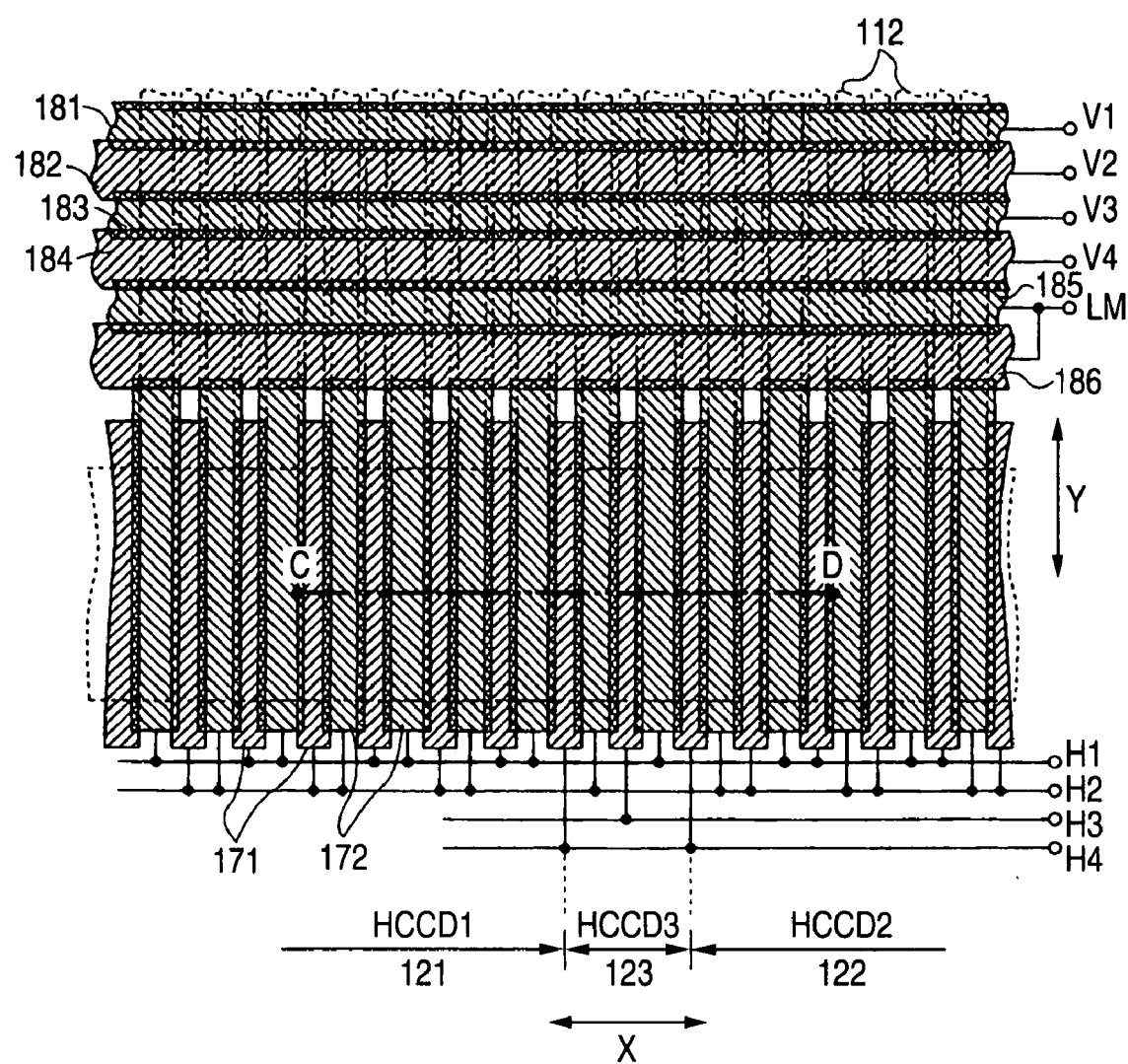
FIG. 8 is an enlarged plan view illustrating the detailed configuration of a part of a solid-state imaging device according to a second embodiment.
Figure 9:
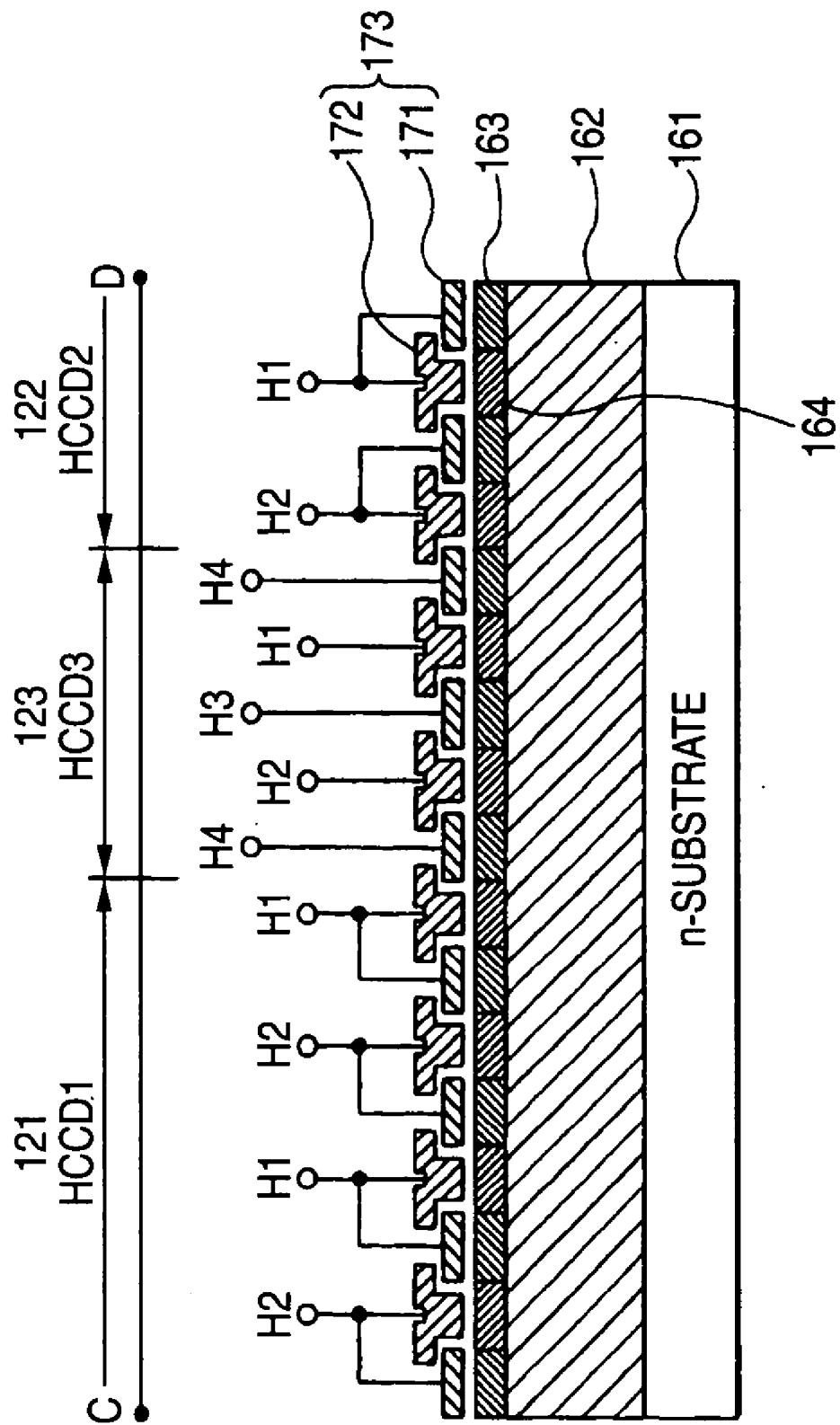
FIG. 9 is a longitudinal sectional view illustrating the section structure taken along the line C-D of FIG. 8.

FIG. 8 is an enlarged plan view illustrating the detailed configuration of a part of a solid-state imaging device according to a second embodiment. FIG. 9 is a longitudinal sectional view illustrating the section structure taken along the line C-D of FIG. 8. FIGS. 10 to 13 are timing charts illustrating examples of a horizontal transfer operation in the solid-state imaging device shown in FIG. 8.

Similar to the configuration of the solid-state imaging device 100 according to the first embodiment shown in FIG. 1, a solid-state imaging device according to the second embodiment includes a horizontal charge transfer section (HCCD1) 121, a horizontal charge transfer section (HCCD2) 122, and a horizontal charge transfer section (HCCD3) 123. In addition, in FIGS. 10 to 13, components corresponding to those in the first embodiment are denoted by the same reference numerals.

In this embodiment, as shown in FIG. 8, electrodes 185 and 186 to which a control signal LM is applied are provided in boundary portions where the vertical charge transfer sections (VCCD) 112 and the horizontal charge transfer sections (121 to 123) are connected. As a result of this modification, the number of first electrodes 171 and second electrodes 172 in each of the horizontal charge transfer sections (121 to 123) is reduced to about a half. That is, although it is necessary to provide two sets of first electrodes 171 and second electrodes 172 per column of vertical charge transfer section (VCCD) 112 in the first embodiment, it is sufficient to provide only one set of first electrodes 171 and second electrodes 172 per column of vertical charge transfer section (VCCD) 112 in the second embodiment.

In order to read out signal charges, the signal charges transferred from a plurality of columns of vertical charge transfer sections are temporarily accumulated in a line memory LM and the temporarily accumulated signal charges are transferred to the horizontal charge transfer sections 121 to 123 at a timing when desired signal charges reach the line memory LM.

As shown in FIG. 9, in regions of the horizontal charge transfer section (HCCD1) 121 and the horizontal charge transfer section (HCCD2) 122, the first electrode 171 and the second electrode 172 located to be adjacent to each other form each electrode pair 173, and the first electrode 171 and the second electrode 172 of each electrode pair 173 are electrically connected to each other through a common wiring line. However, in a region of the horizontal charge transfer section (HCCD3) 123, the first electrode 171 and the second electrode 172 located to be adjacent to each other are wired independently from each other.

That is, in the same manner as in the first embodiment, two-phase transfer pulses H1 and H2 are alternately applied to each electrode pair 173 in the regions of the horizontal charge transfer section (HCCD1) 121 and horizontal charge transfer section (HCCD2) 122, and four-phase transfer pulses H1, H2, H3, and H4 are applied to the first electrodes 171 and the second electrodes 172 in the region of the horizontal charge transfer section (HCCD3) 123.

In the example shown in FIG. 9, since the number of first electrodes 171 in the region of the horizontal charge transfer section (HCCD3) 123 is '3' and the number of second electrodes 172 in the region of the horizontal charge transfer section (HCCD3) 123 is '2', the number of first electrodes 171 and the number of second electrodes 172 are greatly reduced as compared with the case described in the first embodiment.

Figure 10:
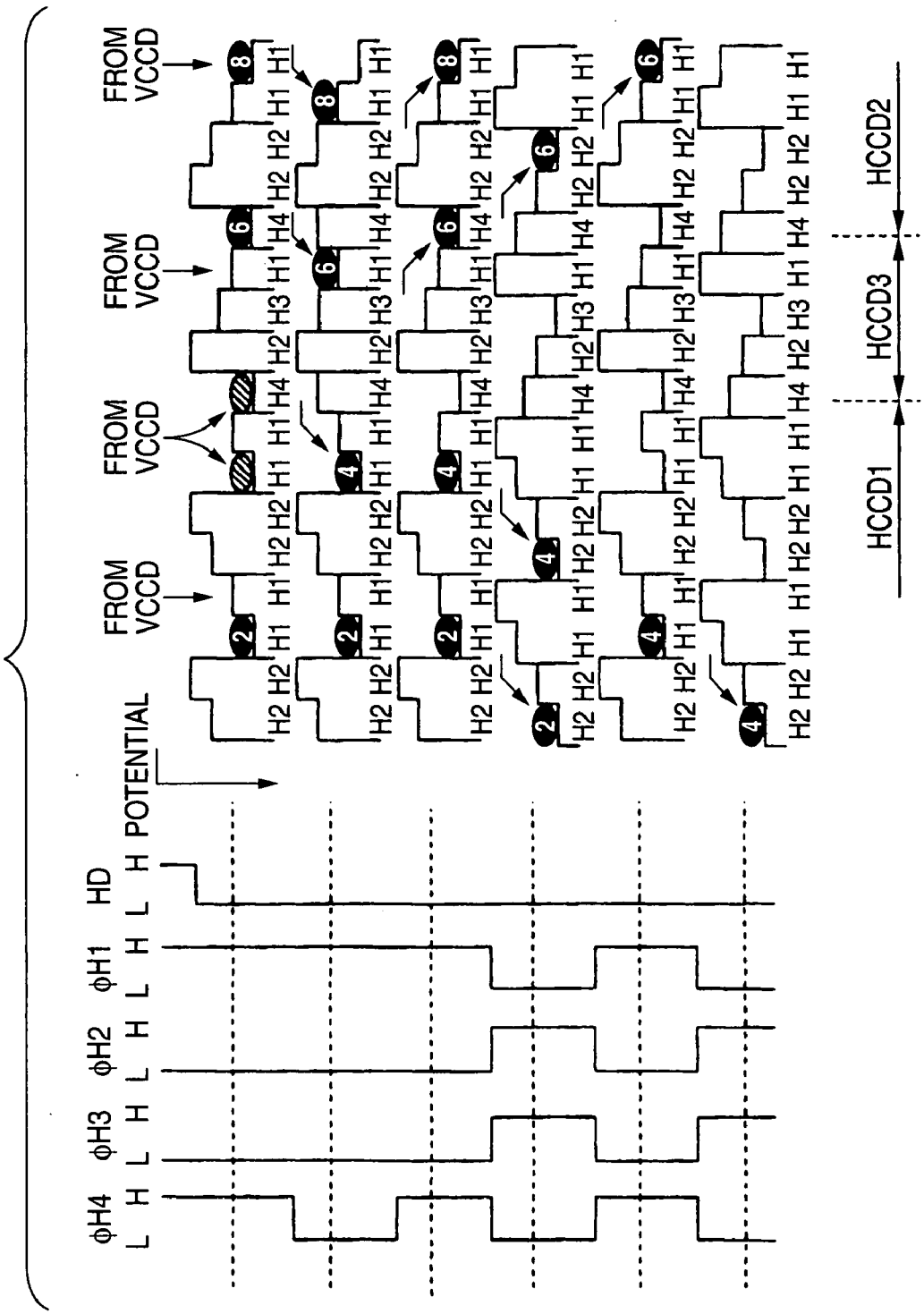
FIG. 10 is a timing chart illustrating an example of a horizontal transfer operation in the solid-state imaging device shown in FIG. 8.
Figure 13:
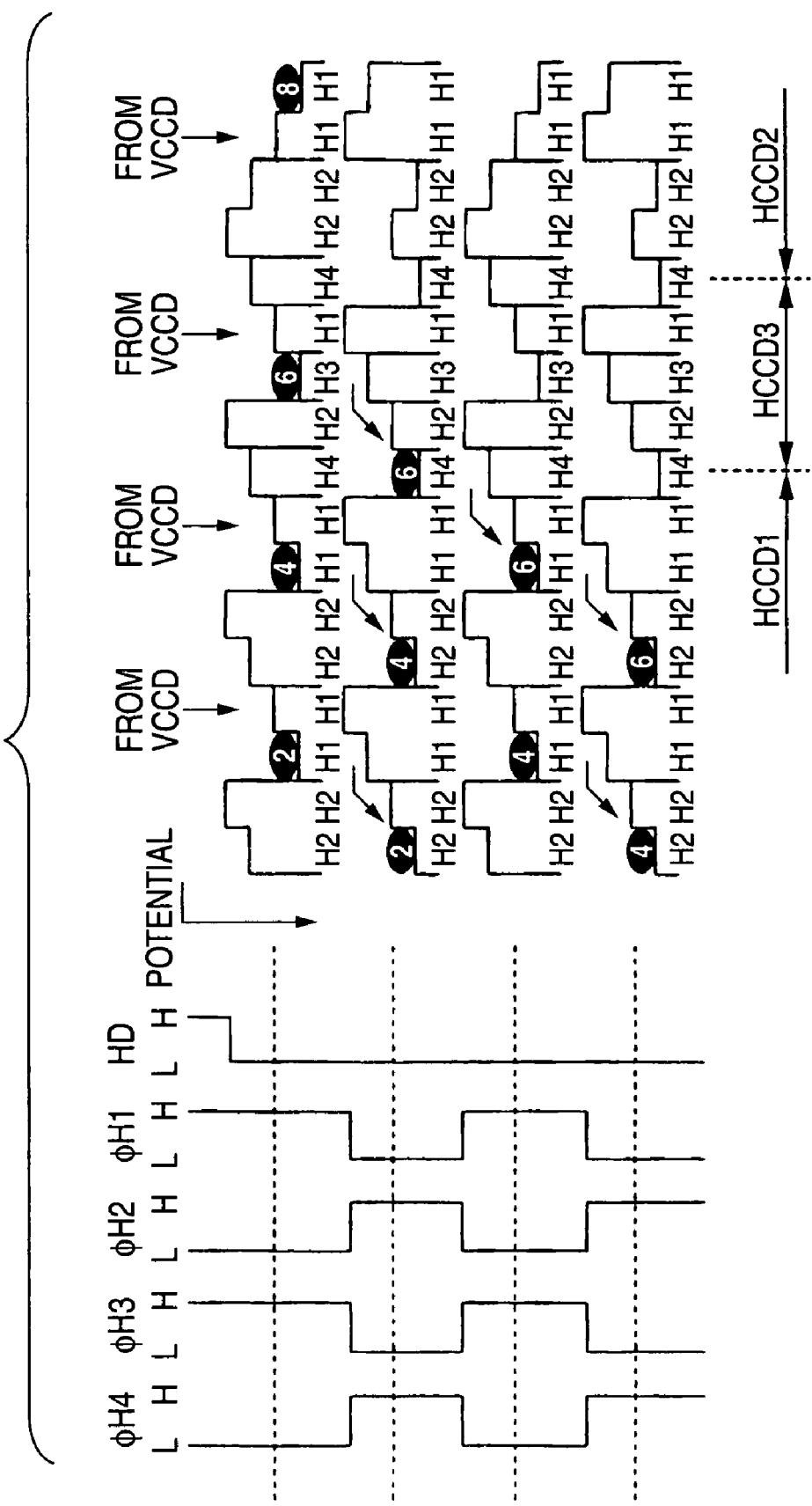
FIG. 13 is a timing chart illustrating an example of a horizontal transfer operation in the solid-state imaging device shown in FIG. 8.

Here, examples of a transfer operation of signal charges near the horizontal charge transfer section (HCCD3) 123, which is located in the central portion of the solid-state imaging device 100 according to the second embodiment, are shown in FIGS. 10 and 13.

That is, by controlling the four-phase transfer pulses H1 to H4 applied to electrodes of the solid-state imaging device 100 as shown in FIG. 10, signal charges in even-numbered columns (signal charges indicated by even numbers in the drawing) can be transferred in the direction from right to left in the horizontal charge transfer section (HCCD1) 121 and transferred in the direction from left to right in the horizontal charge transfer section (HCCD2) 122 and the horizontal charge transfer section (HCCD3) 123.

Figure 11:
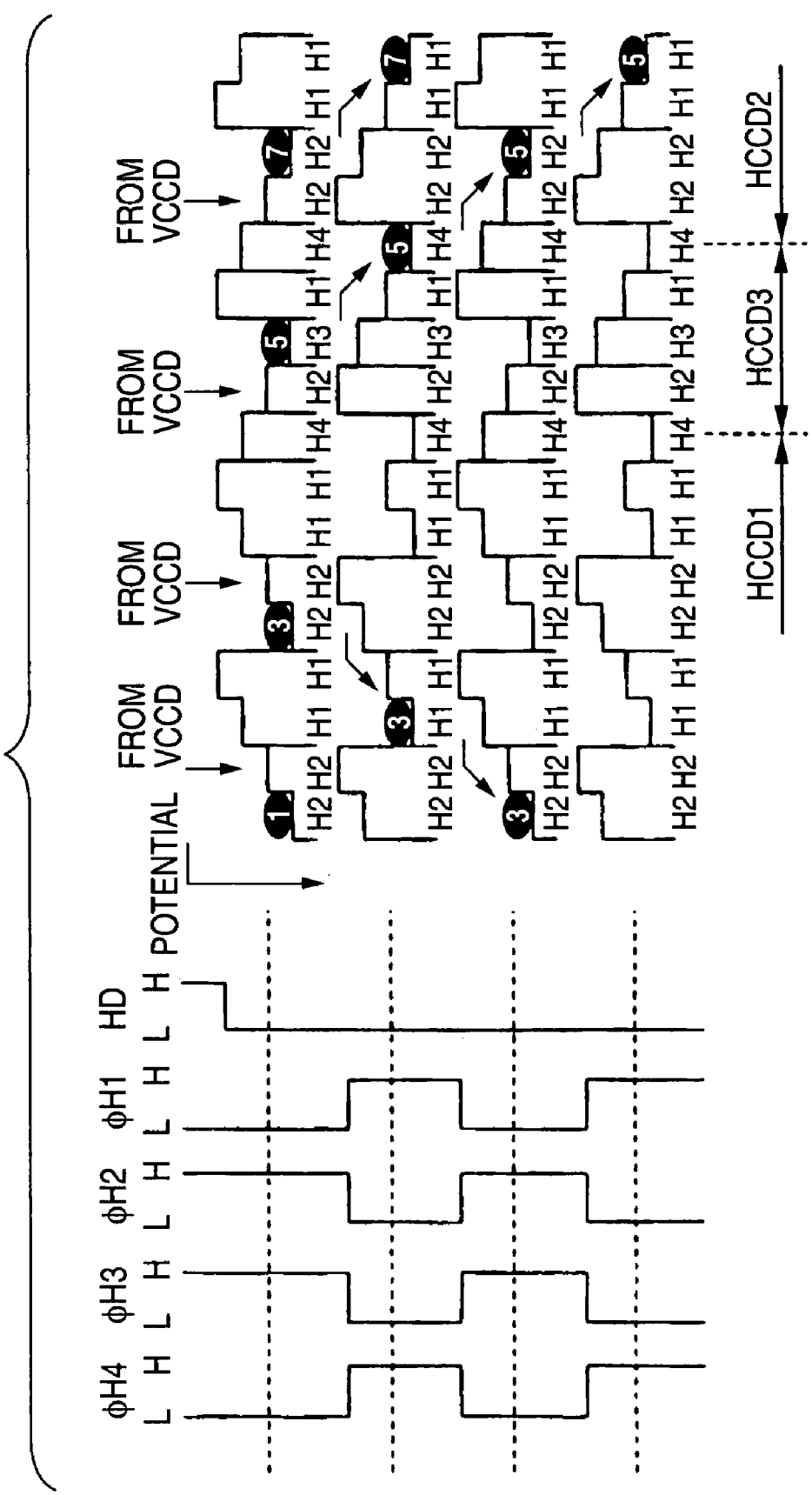
FIG. 11 is a timing chart illustrating an example of a horizontal transfer operation in the solid-state imaging device shown in FIG. 8.

In addition, in the case of transferring signal charges in odd-numbered columns (signal charges indicated by odd numbers in the drawing), the signal charges can be transferred in the direction from right to left in the horizontal charge transfer section (HCCD1) 121 and transferred in the direction from left to right in the horizontal charge transfer section (HCCD2) 122 and the horizontal charge transfer section (HCCD3) 123 by controlling the four-phase transfer pulses H1 to H4 as shown in FIG. 11.

Figure 12:
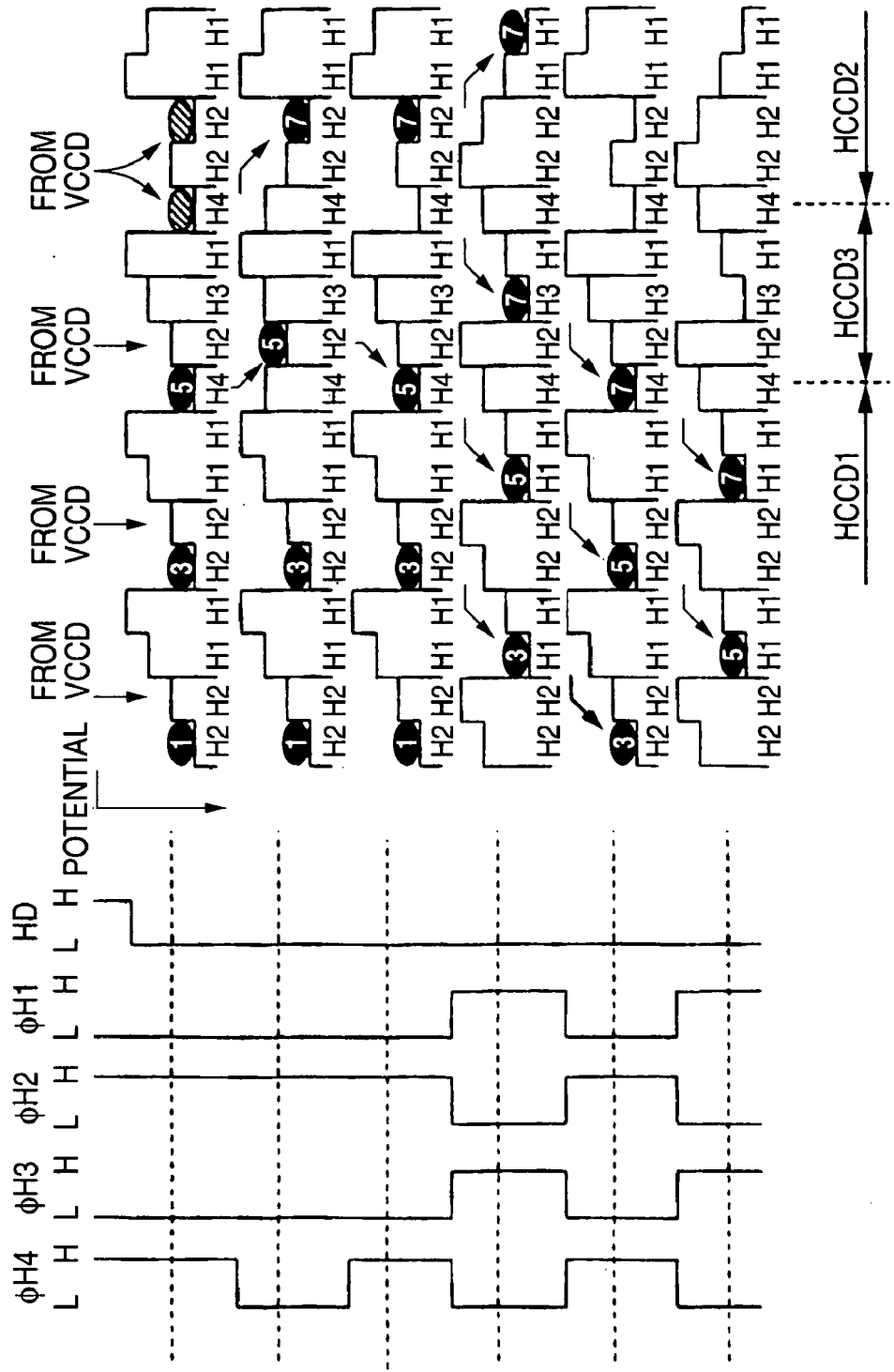
FIG. 12 is a timing chart illustrating an example of a horizontal transfer operation in the solid-state imaging device shown in FIG. 8.

On the other hand, by controlling the four-phase transfer pulses H1 to H4 applied to electrodes of the solid-state imaging device 100 as shown in FIG. 12, the signal charges in the even-numbered columns (signal charges indicated by even numbers in the drawing) can be transferred in the direction from right to left in the horizontal charge transfer section (HCCD1) 121 and the horizontal charge transfer section (HCCD3) 123 and transferred in the direction from left to right in the horizontal charge transfer section (HCCD2) 122.

Moreover, in the case of transferring signal charges in odd-numbered columns (signal charges indicated by odd numbers in the drawing), the signal charges can be transferred in the direction from right to left in the horizontal charge transfer section (HCCD1) 121 and the horizontal charge transfer section (HCCD3) 123 and transferred in the direction from left to right in the horizontal charge transfer section (HCCD2) 122 by controlling the four-phase transfer pulses H1 to H4 as shown in FIG. 13.

Third Embodiment

Figure 14:
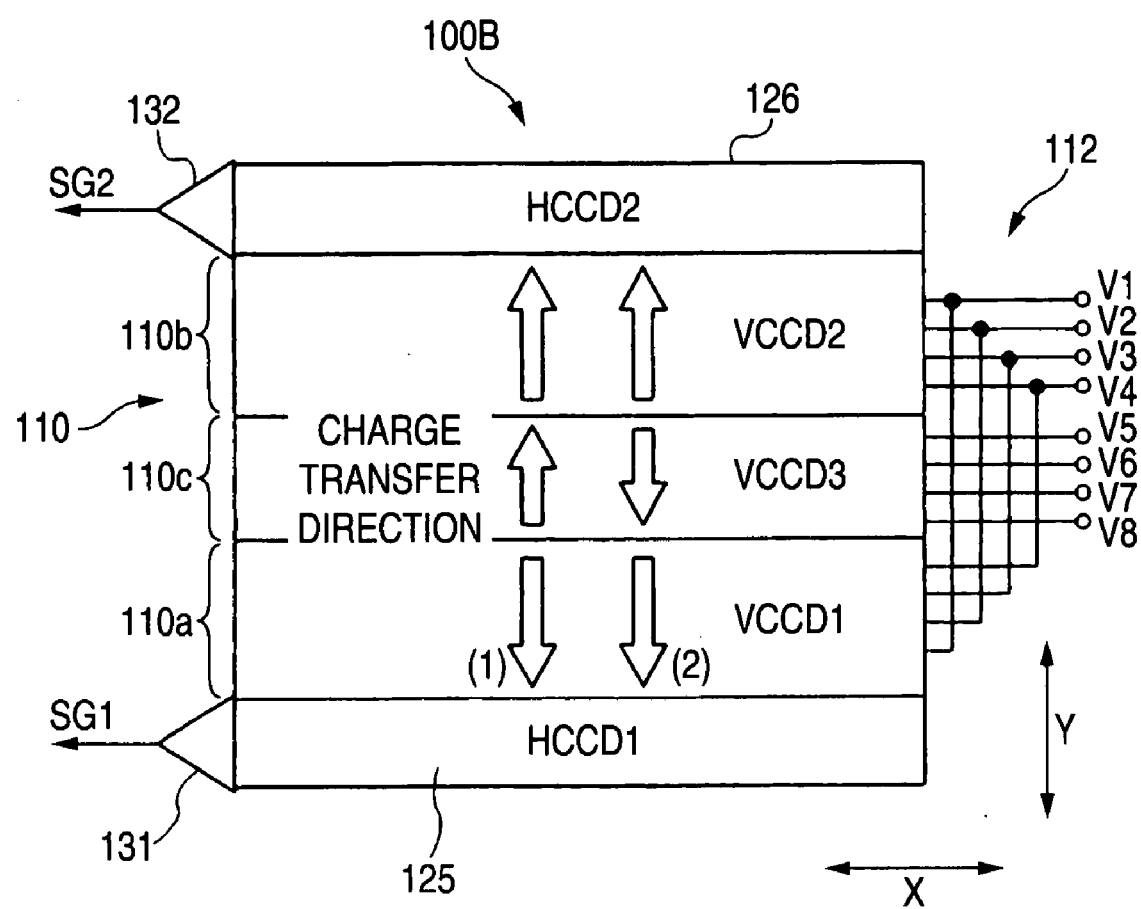
FIG. 14 is a block diagram illustrating main constituent components of a solid-state imaging device according to a third embodiment as viewed from the above.

Hereinafter, a solid-state imaging device according to still another embodiment of the invention will be described with reference to FIG. 14. FIG. 14 is a block diagram illustrating main constituent components of a solid-state imaging device according to a third embodiment as viewed from the above.

Similar to the solid-state imaging device 100 described above, a solid-state imaging device 100B shown in FIG. 14 includes a photoelectric conversion section 110 in which a plurality of photodiodes 111 are arranged in the two-dimensional manner. Here, the photoelectric conversion section 110 shown in FIG. 14 is divided into three regions 110a, 110b, and 110c in the vertical direction.

In addition, even though the above-mentioned vertical charge transfer sections (VCCD) 112 are provided at the positions adjacent to the photodiodes 111 in each column similar to the solid-state imaging device 100 described above, the vertical charge transfer sections (VCCD) 112 are provided independently for each region of the photoelectric conversion section 110.

That is, the vertical charge transfer sections (VCCD) 112 include a vertical charge transfer section (VCCD1) provided in a region 110a of the photoelectric conversion section 110, a vertical charge transfer section (VCCD2) provided in a region 110b, and a vertical charge transfer section (VCCD3) provided in a region 110c. These vertical charge transfer sections (VCCD1, VCCD2, and VCCD3) can be configured in the same manner as the horizontal charge transfer sections 121 to 123 in the first embodiment.

That is, it is possible to configure such that the vertical charge transfer section (VCCD1) shown in FIG. 14 transmits signal charges in the direction from top to bottom in the drawing and the vertical charge transfer section (VCCD2) transmits the signal charges in the direction from bottom to top in the drawing. In addition, the vertical charge transfer section (VCCD3) can be configured such that the direction of transfer of signal charges is switched to any one of the direction from bottom to top in the drawing and the direction from top to bottom in the drawing.

A horizontal charge transfer section (HCCD1) 125 is connected to a downstream end of the vertical charge transfer section (VCCD1), and a horizontal charge transfer section (HCCD2) 126 is connected to a downstream end of the vertical charge transfer section (VCCD2).

Therefore, signal charges generated by the photodiodes 111 existing in the region 110a of the photoelectric conversion section 110 are transferred in the vertical direction (Y direction) by the vertical charge transfer section (VCCD1), then transferred to a channel on the horizontal charge transfer section (HCCD1) 125, and then transferred through the horizontal charge transfer section (HCCD1) 125 in the horizontal direction (X direction) to be output from the signal output amplifier 131.

Further, signal charges generated by the photodiodes 111 existing in the region 110b of the photoelectric conversion section 110 are transferred in the vertical direction (Y direction) by the vertical charge transfer section (VCCD2), then transferred to a channel on the horizontal charge transfer section (HCCD2) 126, and then transferred through the horizontal charge transfer section (HCCD2) 126 in the horizontal direction (X direction) to be output from the signal output amplifier 132.

On the other hand, the direction of transfer of signal charges in the vertical charge transfer section (VCCD3) can be changed by changing transfer pulses (V5 to V8) applied to electrodes of the vertical charge transfer section (VCCD3). Signal charges generated by the photodiodes 111 existing in the region 110c of the photoelectric conversion section 110 can be transferred from the vertical charge transfer section (VCCD3) through the vertical charge transfer section (VCCD1) and the horizontal charge transfer section (HCCD1) 125 and then output from the signal output amplifier 131. In addition, the signal charges generated by the photodiodes 111 existing in the region 110c of the photoelectric conversion section 110 can also be transferred from the vertical charge transfer section (VCCD3) through the vertical charge transfer section (VCCD2) and the horizontal charge transfer section (HCCD2) 126 and then output from the signal output amplifier 132.

That is, the signal charges generated by the photodiodes 111 existing in the region 110c of the photoelectric conversion section 110 can be output as common signals to both the image signals SG1 and SG2. Thus, in the same manner as in the first embodiment, it becomes possible to correct an error of an image signal resulting from the difference in the characteristics of the signal output amplifiers 131 and 132 by using the common signals. As a method of the signal correction, the same processing as that in the first embodiment may be performed.

Fourth Embodiment

Hereinafter, a solid-state imaging device according to still another embodiment of the invention will be described with reference to FIG. 15.

Figure 15:
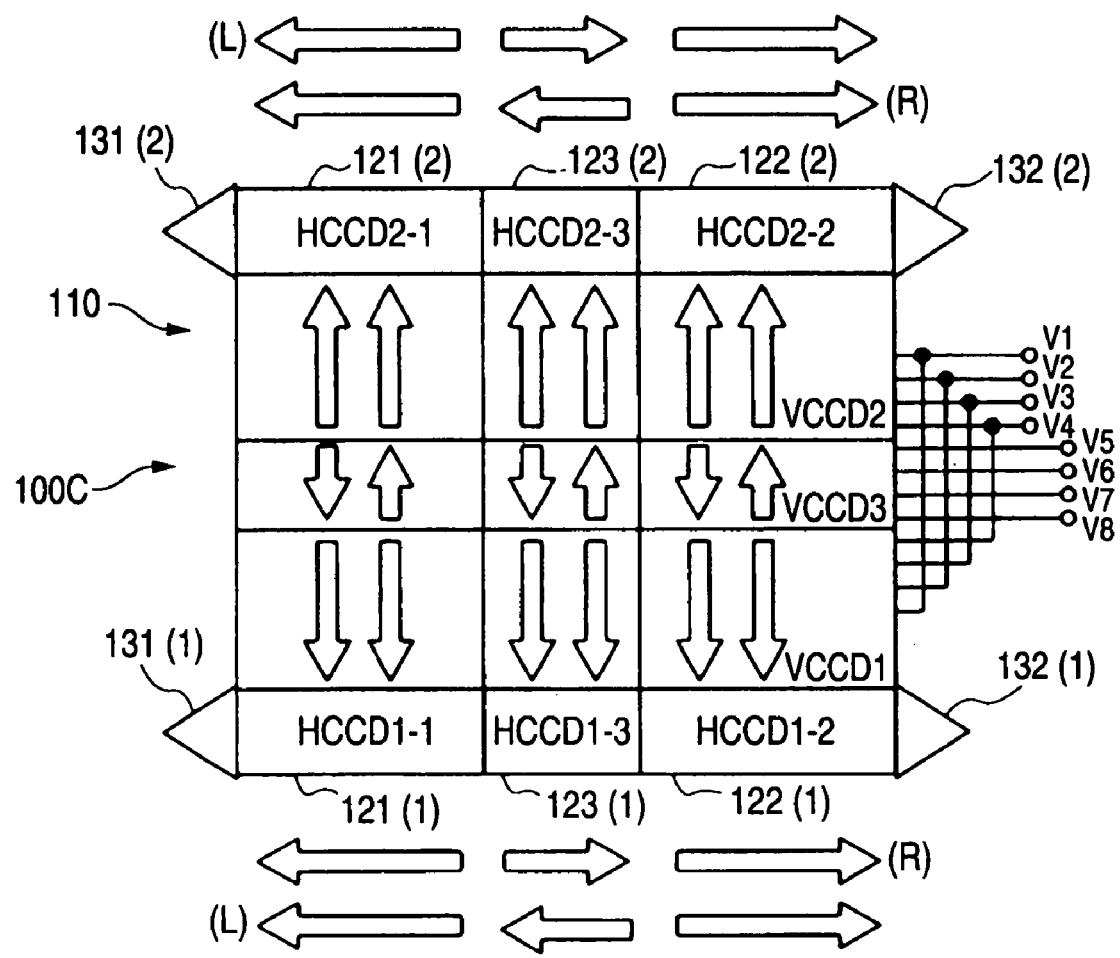
FIG. 15 is a block diagram illustrating main constituent components of a solid-state imaging device according to a fourth embodiment as viewed from the above.

FIG. 15 is a block diagram illustrating main constituent components of a solid-state imaging device according to a fourth embodiment as viewed from the above.

In the present embodiment, a solid-state imaging device 100C shown in FIG. 15 is configured by combining features of the first and third embodiments described above.

Similar to the solid-state imaging device 100 described above, the solid-state imaging device 100C shown in FIG. 15 includes a photoelectric conversion section 110 in which a plurality of photodiodes 111 are arranged in the two-dimensional manner. In this case, since the photoelectric conversion section 110 shown in FIG. 15 is divided into three regions in the horizontal direction and is also divided into three regions in the vertical direction, totally nine regions exist.

Further, similar to the first embodiment, the solid-state imaging device 100C shown in FIG. 15 is configured such that a plurality of independently controllable horizontal charge transfer sections (HCCD) 121, 122, and 123 are provided for each of the divided regions obtained by the horizontal-direction division of the photoelectric conversion section 110 and the horizontal charge transfer section 123 positioned in the middle can switch the direction of transfer of signal charges to the direction from right to left or the direction from left to right.

Furthermore, similar to the third embodiment, the solid-state imaging device 100C shown in FIG. 15 is configured such that a plurality of independently controllable vertical charge transfer sections (VCCD1, VCCD2, VCCD3) are provided for each of the divided regions obtained by the vertical-direction division of the photoelectric conversion section 110 and the vertical charge transfer section (VCCD3) positioned in the middle can switch the direction of transfer of signal charges to the direction from top to bottom or the direction from bottom to top.

Furthermore, in accordance with the vertical-direction division of the photoelectric conversion section 110, the horizontal charge transfer sections (HCCD) 121, 122, and 123 are provided at a downstream end of the vertical charge transfer section (VCCD1) and a downstream end of the vertical charge transfer section (VCCD2). In addition, two signal output amplifiers 131 and 132 are provided, respectively.

As for a difference in characteristics of the signal output amplifier 131(1) and signal output amplifier 132(1) and a difference in characteristics of the signal output amplifier 131(2) and signal output amplifier 132(2), it is possible to perform correction processing in the same method as that in the first embodiment. In addition, as for the difference in characteristics of the signal output amplifier 131(1) and signal output amplifier 131(2) and the difference in characteristics of the signal output amplifier 132(1) and signal output amplifier 132(2), it is possible to perform correction processing in the same method as that in the third embodiment.

Fifth Embodiment

Figure 16:
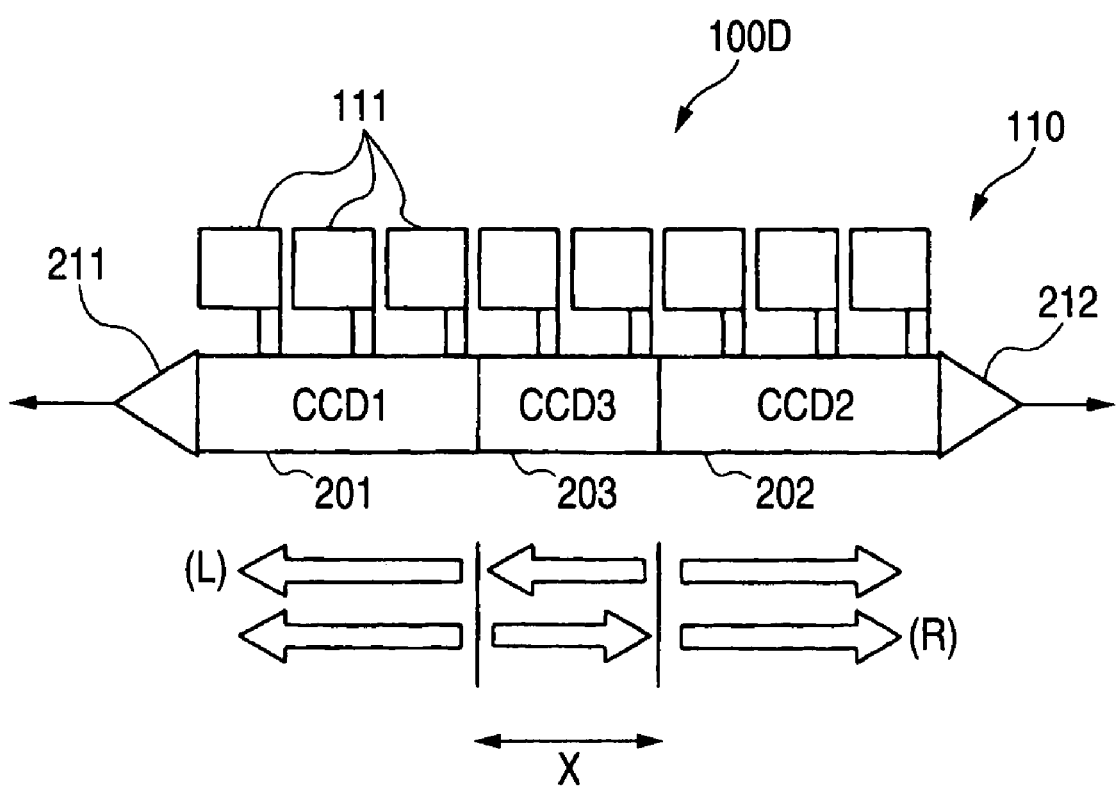
FIG. 16 is a block diagram illustrating main constituent components of a solid-state imaging device according to a fifth embodiment as viewed from the above.

Hereinafter, a solid-state imaging device according to still another embodiment of the invention will be described with reference to FIG. 16. FIG. 16 is a block diagram illustrating main constituent components of a solid-state imaging device according to a fifth embodiment as viewed from the above.

In the present embodiment, a case of applying the invention to a linear image sensor in which a plurality of photodiodes are arranged in a one-dimensional manner is assumed. That is, in a solid-state imaging device 100D shown in FIG. 16, a photoelectric conversion section 110 has a plurality of photodiodes 111 arranged in the one-dimensional manner in the direction indicated by arrow X. Three divided charge transfer sections (CCD) 201, 202, and 203 are provided at positions adjacent to photodiodes 111.

Signal charges that are generated by the photodiodes 111 by imaging (exposure) are transferred to any one of the charge transfer sections 201 to 203 existing at the positions adjacent to photodiodes 111 and are then sequentially transferred through transfer channels of the charge transfer sections 201 to 203 for every pixel.

The direction of transfer of signal charges in the charge transfer section 201 is a direction from right to left in the drawing, and the direction of transfer of signal charges in the charge transfer section 202 is a direction from left to right in the drawing. In addition, as the direction of transfer of signal charges in the charge transfer section 203, it is possible to select either a direction from right to left in the drawing or a direction from left to right in the drawing.

Accordingly, signal charges generated by the photodiodes 111 existing at the positions corresponding to the charge transfer section 201 are sequentially transferred from right to left through the charge transfer section 201 to be then output from the signal output amplifier 211. In addition, signal charges generated by the photodiodes 111 existing at the positions corresponding to the charge transfer section 202 are sequentially transferred from left to right through the charge transfer section 202 to be then output from the signal output amplifier 212.

Furthermore, signal charges generated by the photodiodes 111 existing at the positions corresponding to the charge transfer section 203 are transferred from right to left through the charge transfer section 203 and then output from the signal output amplifier 211 through the charge transfer section 201, or transferred from left to right through the charge transfer section 203 and then output from the signal output amplifier 212 through the charge transfer section 202.

Thus, in the same manner as in the first embodiment, it is possible to accurately correct an error of an image signal resulting from the difference in the characteristics of the signal output amplifiers 211 and 212.

As described above, by applying the invention to a two-dimensional solid-state imaging device for use in a digital camera or the like or a linear image sensor for use in an image scanner or the like, it is possible to prevent the image quality from deteriorating due to the difference in characteristics of a plurality of output parts (for example, amplifiers) even in the case where a photoelectric conversion part is divided into a plurality of regions in order to increase the reading speed. In addition, since signal charges are corrected using light received from a photographic subject, it is possible to prevent the structure from being complicated.

What is claimed is:

1. A solid-state imaging device comprising:
a photoelectric conversion section comprising a plurality of photoelectric conversion elements that are arranged along at least one axis direction on a predetermined semiconductor substrate;
an analog shift register that receives signal charges generated by the photoelectric conversion elements of the photoelectric conversion section and that transfers the received signal charges in a predetermined direction; and
a signal output unit connected to a downstream end of the analog shift register, wherein:
the analog shift register is divided into a first transfer section and a second transfer section with a substantially central region of the analog shift register being set as a boundary,
a common transfer section is provided in the boundary between the first transfer section and the second transfer section, and
the common transfer section selects, as a transfer path of the signal charges transferred from the photoelectric conversion section, either a first path passing through the first transfer section or a second path passing through the second transfer section.

2. The solid-state imaging device according to claim 1, wherein:
each of the first transfer section, the second transfer section and the common transfer section of the analog shift register comprises:
a charge transfer path including an impurity layer formed on the semiconductor substrate; and
a charge transfer electrode section disposed at a position opposite to the charge transfer path,
each of the charge transfer electrode sections comprises a plurality of electrode pairs disposed along the charge transfer path,
each of the plurality of electrode pairs comprises a first electrode and a second electrode disposed at a position adjacent to the first electrode, and
at least one of the first electrode and the second electrode of the charge transfer electrode section of the common transfer section of the analog shift register is wired so as to be electrically independent from the first and second electrodes of the first transfer section and the first and second electrodes of the second transfer section.

3. The solid-state imaging device according to claim 2, further comprising:
a driving circuit connected to the charge transfer electrode section, wherein:

the driving circuit applies driving signals, which are independent from each other, to the first and second electrodes of the common transfer section of the analog shift register, and
the driving circuit applies at least two kinds of driving signals to the first and second electrodes of the common transfer section of the analog shift register.

4. The solid-state imaging device according to claim 1, further comprising:
a plurality of vertical charge transfer sections that transfer the signal charges generated by the photoelectric conversion elements of the photoelectric conversion section in a column direction; and
a horizontal charge transfer section that receives the signal charges output to downstream ends of the plurality of vertical charge transfer sections and transfers the received signal charges in a row direction, wherein:
the photoelectric conversion section forms a two-dimensional imaging section in which the plurality of photoelectric conversion elements are arranged in the row and column directions in a two-dimensional manner, and
the configuration of the analog shift register is applied to the horizontal charge transfer section.

5. The solid-state imaging device according to claim 1, further comprising:
a plurality of vertical charge transfer sections that transfer the signal charges generated by the photoelectric conversion elements of the photoelectric conversion section in a column direction; and
a horizontal charge transfer section that receives the signal charges output to downstream ends of the plurality of vertical charge transfer sections and transfers the received signal charges in a row direction, wherein:
the photoelectric conversion section forms a two-dimensional imaging section in which the plurality of photoelectric conversion elements are arranged in the row and column directions in a two-dimensional manner, and
the configuration of the analog shift register is applied to each of the vertical charge transfer sections.

6. A driving method for the solid-state imaging device according to claim 1, comprising:
transferring the signal charges generated by the photoelectric conversion section to the analog shift register;
transferring the signal charges, which are received by the common transfer section of the analog shift register, on the analog shift register through one of the first and second paths;
transferring the signal charges generated by the photoelectric conversion section to the analog shift register again;
transferring the signal charges, which are received by the common transfer section of the analog shift register, on the analog shift register through the other of the first and second paths; and
correcting an output signal based on a difference between a first signal and a second signal, wherein:
the first signal is output based on the signal charges which are received by the common transfer section and which are transferred through the one of the first and second paths, and
the second signal is output by the signal charges which are received by the common transfer section and which are transferred through the other of the first and second paths.

* * * * *